US012639984B2

(12) United States Patent　(10) Patent No.:　US 12,639,984 B2
Koda　(45) Date of Patent:　May 26, 2026

(54) INFORMATION PROCESSING APPARATUS AND INFORMATION PROCESSING METHOD

(71) Applicant: NEC Corporation, Tokyo (JP)

(72) Inventor: Yoshinori Koda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/857,216

(22) PCT Filed: Jul. 10, 2023

(86) PCT No.: PCT/JP2023/025396
§ 371 (c)(1),
(2) Date: Oct. 16, 2024

(87) PCT Pub. No.: WO2024/034308
PCT Pub. Date: Feb. 15, 2024

(65) Prior Publication Data
US 2025/0259480 A1　Aug. 14, 2025

(30) Foreign Application Priority Data
Aug. 10, 2022　(JP) ................................. 2022-128256

(51) Int. Cl.
*G06V 40/50*　(2022.01)
*G06V 40/12*　(2022.01)
*G06V 40/13*　(2022.01)
(52) U.S. Cl.
CPC .......... *G06V 40/50* (2022.01); *G06V 40/1318* (2022.01); *G06V 40/1365* (2022.01)

(58) Field of Classification Search
CPC ............... G06V 40/50; G06V 40/1318; G06V 40/1365; G06V 40/13; G06T 7/00
See application file for complete search history.

(56) References Cited

U.S. PATENT DOCUMENTS

2008/0101662 A1 *　5/2008　Lo ...................... G06V 40/1365
382/124
2015/0046711 A1　2/2015　Slaby et al.
(Continued)

FOREIGN PATENT DOCUMENTS

JP　2006-039720 A　2/2006
JP　2006-165987 A　6/2006
(Continued)

OTHER PUBLICATIONS

International Search Report for PCT Application No. PCT/JP2023/025396, mailed on Aug. 8, 2023.
(Continued)

*Primary Examiner* — Abhishek Sarma
(74) *Attorney, Agent, or Firm* — Sughrue Mion, PLLC

(57)　ABSTRACT

An information processing apparatus includes: an acquisition unit that performs an acquisition operation of acquiring a surface image including fingerprints of a target person; a first estimation unit that performs a first estimation operation of estimating a pattern of the fingerprints from the acquired surface image; and an estimation control unit that controls the acquisition unit and the first estimation unit to repeat the acquisition operation and the first estimation operation until a predetermined number of surface images estimated by the first estimation unit to have a first pattern are acquired.

5 Claims, 13 Drawing Sheets

(56)    References Cited

U.S. PATENT DOCUMENTS

| | | |
|---|---|---|
| 2016/0232401 A1 | 8/2016 | Hoyos et al. |
| 2018/0089484 A1 | 3/2018 | Satou et al. |

FOREIGN PATENT DOCUMENTS

| | | |
|---|---|---|
| JP | 2011-044102 A | 3/2011 |
| JP | 2020-501264 A | 1/2020 |
| JP | 2020-074174 A | 5/2020 |
| KR | 20080019833 A | 3/2008 |
| WO | 2016/159052 A1 | 10/2016 |
| WO | 2019/207649 A1 | 10/2019 |

OTHER PUBLICATIONS

JP Office Action for JP Application No. 2024-540320, mailed on Jan. 13, 2026 with English Translation.

* cited by examiner

D

D

D

D

D

D

D

D

D

D

D

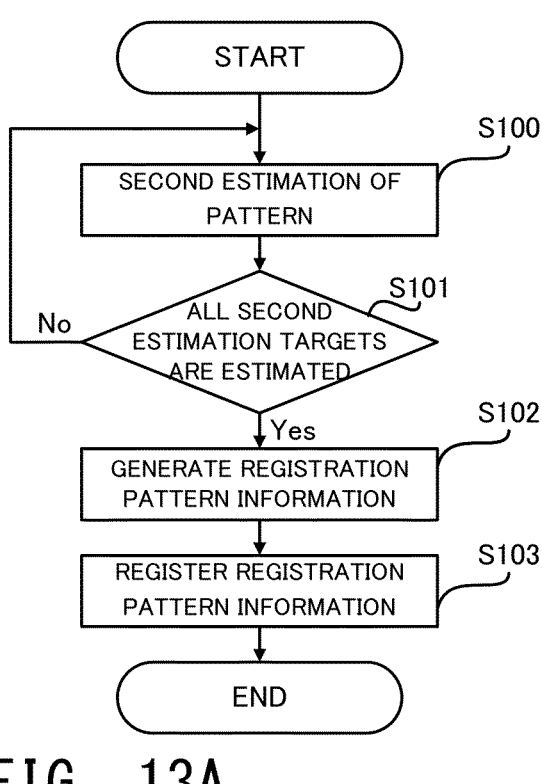

START

SECOND ESTIMATION OF PATTERN    S100

ALL SECOND ESTIMATION TARGETS ARE ESTIMATED    S101
No

Yes

GENERATE REGISTRATION PATTERN INFORMATION    S102

REGISTER REGISTRATION PATTERN INFORMATION    S103

END

FIG. 13A

START

SECOND ESTIMATION OF PATTERN    S200

ALL SECOND ESTIMATION TARGETS ARE ESTIMATED    S201
No

Yes

GENERATE VERIFICATION PATTERN INFORMATION    S202

COLLATE/VERIFY IT WITH REGISTRATION PATTERN INFORMATION    S203

END

INFORMATION PROCESSING APPARATUS AND INFORMATION PROCESSING METHOD

This application is a National Stage Entry of PCT/JP2023/025396 filed on Jul. 10, 2023, which claims priority from Japanese Patent Application 2022-128256 filed on Aug. 10, 2022, the contents of all of which are incorporated herein by reference, in their entirety.

TECHNICAL FIELD

This disclosure relates to technical fields of an information processing apparatus, an information processing method, and a recording medium.

BACKGROUND ART

Patent Literature 1 describes an authentication apparatus including: a feature extraction unit that extracts feature information from biometric information about a verification subject acquired by a biometric information sensor; a feature information storage unit that stores feature information of biometric information about one or more users and a plurality of nonusers; a first matching score calculation unit that calculates a first matching score by comparing verification subject feature information of the biometric information about the verification subject extracted by the feature extraction unit, with verification person feature information of biometric information about a verification person, who is one of the users stored in the feature information storage unit, and with nonuser feature information of the biometric information about the plurality of nonusers; a matching score correction unit that, on the basis of the first matching score calculated by comparing with the feature information about the plurality of nonusers, corrects the first matching score calculated by comparing with the verification person feature information; and an authentication unit that authenticates the verification subject as the verification person if the corrected first matching score is greater than or equal to a preset determination threshold.

Patent Literature 2 describes a technique/technology of: capturing, by a mobile device, high-resolution images each representing a plurality of fingers to be targeted; identifying, based on segmentation algorithm, each fingertip segment for each of the plurality of fingers from the high-resolution images; extracting, for each finger, an identifiable feature from each fingertip segment; generating a biometric identifier including the extracted identifiable features; and storing the generated biometric identifier in a memory.

Patent Literature 3 describes a technique/technology of: capturing biometric features of a user and generating an identifier that characterizes the biometric features of the user using a mobile device, such as a smartphone. The biometric identifier is generated using captured images of a plurality of fingers of the user, for purposes of authenticating/identifying the user according to the captured biometrics and determining the presence of the user. The Patent Literature 3 also describes additional techniques/technologies that prevent misidentification by spoofing. In the Patent Literature 3, anti-spoofing measures may include capturing one or more images of the user's finger and analyzing the captured images for indications of presence.

CITATION LIST

Patent Literature

Patent Literature 1: International Publication No. WO2019/207649

Patent Literature 2: JP2020-074174A
Patent Literature 3: JP2020-501264A

SUMMARY

Technical Problem

It is an example object of this disclosure to provide an information processing apparatus, an information processing method, and a recording medium that aim to improve the techniques/technologies disclosed in Citation List.

Solution to Problem

An information processing apparatus according to an example aspect includes: an acquisition unit that performs an acquisition operation of acquiring a surface image including fingerprints of a target person; a first estimation unit that performs a first estimation operation of estimating a pattern of the fingerprints from the acquired surface image; and an estimation control unit that controls the acquisition unit and the first estimation unit to repeat the acquisition operation and the first estimation operation until a predetermined number of surface images estimated by the first estimation unit to have a first pattern are acquired.

An information processing method according to an example aspect includes: performing an acquisition operation of acquiring a surface image including fingerprints of a target person; performing a first estimation operation of estimating a pattern of the fingerprints from the acquired surface image; and performing control to repeat the acquisition operation and the first estimation operation until a predetermined number of surface images estimated by the first estimation operation to have a first pattern are acquired.

A recording medium according to an example aspect is a recording medium on which a computer program that allows a computer to execute an information processing method is recorded, the information processing method including: performing an acquisition operation of acquiring a surface image including fingerprints of a target person; performing a first estimation operation of estimating a pattern of the fingerprints from the acquired surface image; and performing control to repeat the acquisition operation and the first estimation operation until a predetermined number of surface images estimated by the first estimation operation to have a first pattern are acquired.

BRIEF DESCRIPTION OF DRAWINGS

FIG. 13A is flowcharts illustrating a flow of an information processing operation performed by the information processing apparatus according to the sixth example embodiment.

FIG. 13B is flowcharts illustrating a flow of an information processing operation performed by the information processing apparatus according to the sixth example embodiment.

DESCRIPTION OF EXAMPLE EMBODIMENTS

Hereinafter, an information processing apparatus, an information processing method, and a recording medium according to example embodiments will be described with reference to the drawings.

1: First Example Embodiment

An information processing apparatus, an information processing method, and a recording medium according to a first example embodiment will be described. The following describes the information processing apparatus, the information processing method, and the recording medium according to the first example embodiment, by using an information processing apparatus 1 to which the information processing apparatus, the information processing method, and the recording medium according to the first example embodiment are applied.

1-1: Configuration of Information Processing Apparatus 1

Figure 1:
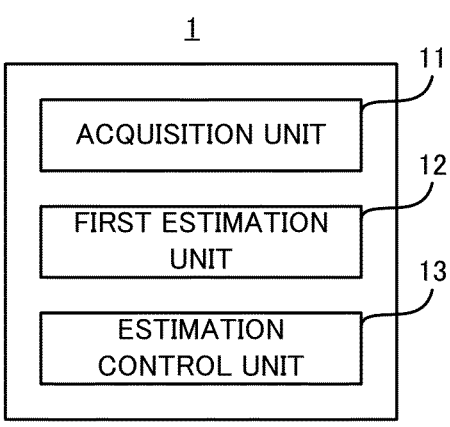
FIG. 1 is a block diagram illustrating a configuration of an information processing apparatus according to a first example embodiment.

With reference to FIG. 1, a configuration of the information processing apparatus 1 according to the first example embodiment will be described. FIG. 1 is a block diagram illustrating the configuration of the information processing apparatus 1 according to the first example embodiment.

As illustrated in FIG. 1, the information processing apparatus 1 includes an acquisition unit 11, a first estimation unit 12, and an estimation control unit 13. The acquisition unit 11 performs an acquisition operation of acquiring a surface image including fingerprints of a target person. The first estimation unit 12 performs a first estimation operation of estimating a pattern of the fingerprints from the acquired surface image. The estimation control unit 13 controls the acquisition unit 11 and the first estimation unit 12 to repeat the acquisition operation and the first estimation operation until a predetermined number of surface images estimated by the first estimation unit 12 to have a first pattern are acquired.

1-2: Technical Effect of Information Processing Apparatus 1

Since the information processing apparatus 1 according to the first example embodiment repeats the acquisition operation and the first estimating operation until the predetermined number of surface images estimated to have the first pattern are acquired, it is possible to accurately estimate the pattern of the fingerprints.

2: Second Example Embodiment

An information processing apparatus, an information processing method, and a recording medium according to a second example embodiment will be described. The following describes the information processing apparatus, the information processing method, and the recording medium according to the second example embodiment, by using an information processing apparatus 2 to which the information processing apparatus, the information processing method, and the recording medium according to the second example embodiment are applied.

2-1: Configuration of Information Processing Apparatus 2

Figure 2:
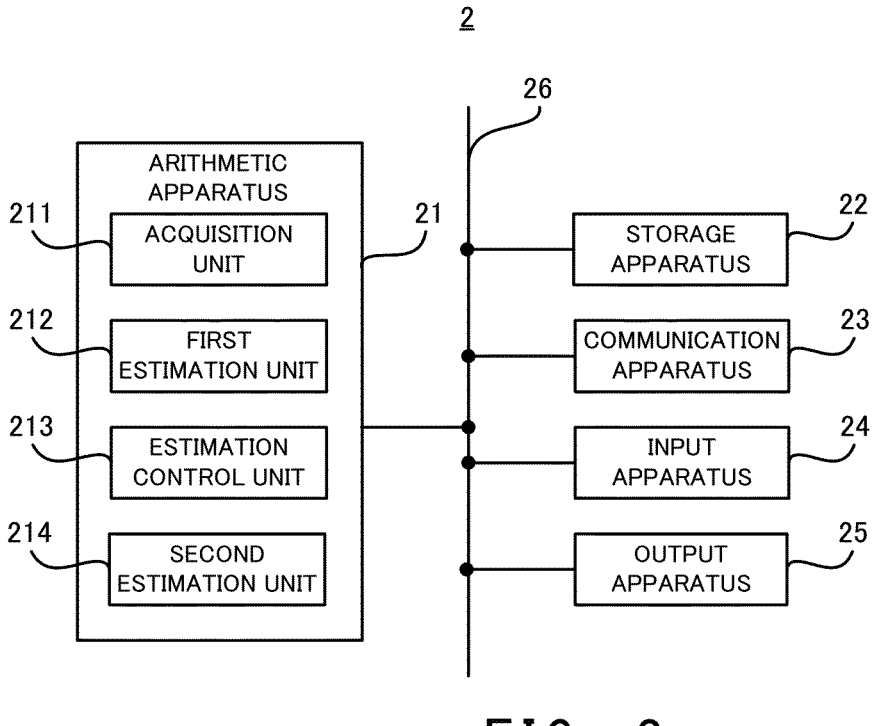
FIG. 2 is a block diagram illustrating a configuration of an information processing apparatus according to a second example embodiment.

With reference to FIG. 2, a configuration of the information processing apparatus 2 according to the second example embodiment will be described. FIG. 2 is a block diagram illustrating the configuration of the information processing apparatus 2 according to the second example embodiment.

As illustrated in FIG. 2, the information processing apparatus 2 includes an arithmetic apparatus 21 and a storage apparatus 22. Furthermore, the information processing apparatus 2 may include a communication apparatus 23, an input apparatus 24, and an output apparatus 25. The information processing apparatus 2, however, may not include at least one of the communication apparatus 23, the input apparatus 24, and the output apparatus 25. The arithmetic apparatus 21, the storage apparatus 22, the communication apparatus 23, the input apparatus 24, and the output apparatus 25 may be connected through a data bus 26.

The arithmetic apparatus 21 includes at least one of a CPU (Central Processing Unit), a GPU (Graphics Processing Unit), and a FPGA (Field Programmable Gate Array), for example. The arithmetic apparatus 21 reads a computer program. For example, the arithmetic apparatus 21 may read a computer program stored in the storage apparatus 22. For example, the arithmetic apparatus 21 may read a computer program stored in the storage apparatus 22. For example, the arithmetic apparatus 21 may read a computer program stored by a computer-readable and non-transitory recording medium, by using a not-illustrated recording medium reading apparatus provided in the information processing apparatus 2 (e.g., the input apparatus 24 described later). The arithmetic apparatus 21 may acquire (i.e., download or read) a computer program from a not-illustrated apparatus disposed outside the information processing apparatus 2, via the communication apparatus 23 (or another communication apparatus). The arithmetic apparatus 21 executes the read computer program. Consequently, a logical functional block for performing an operation to be performed by the information processing apparatus 2 is realized or implemented in the arithmetic apparatus 21. That is, the arithmetic apparatus 21 is allowed to function as a controller for realizing or implementing the logical functional block for performing an operation (in other words, processing) to be performed by information processing apparatus 2.

FIG. 2 illustrates an example of the logical functional block realized or implemented in the arithmetic apparatus 21 to perform an information processing operation. As illustrated in FIG. 2, an acquisition unit 211 that is a specific example of the "acquisition unit" described in Supplementary Note later, a first estimation unit 212 that is a specific example of the "first estimation unit" described in Supplementary Note later, an estimation control unit 213 that is a specific example of the "estimation control unit" described in Supplementary Note later, and a second estimation unit 214 that is a specific example of the "second estimation unit" described in Supplementary Note later, are realized or implemented in the arithmetic apparatus 21. The arithmetic apparatus 21, however, may not include the second estimation unit 214. Detailed operation of each of the acquisition unit 211, the first estimation unit 212, the estimation control unit 213, and the second estimation unit 214 will be described later with reference to FIG. 3.

In this specification, the term "acquisition" may refer to active acquisition in which an apparatus retrieves data stored in another apparatus, a storage medium, or the like, on the basis of a user input or a program instruction. The active acquisition may refer to, for example, requesting to, or inquiring of and receiving from another apparatus, accessing and reading another apparatus, a storage medium, or the like, or similar actions. In this specification, the term "acquisition" may refer to passive acquisition in which data outputted from the other apparatus are inputted to the apparatus, on the basis of a user input or a program instruction. The passive acquisition may refer to, for example, receiving data to be distributed (or transmitted, push notification, etc.), and also selecting and acquiring from the received data or information. Furthermore, in this specification, the term "acquisition" may refer to generating new data by editing data (textualizing, rearranging data, partially extracting data, changing a file format, etc.) and acquiring the new data.

The storage apparatus 22 is configured to store desired data. For example, the storage apparatus 22 may temporarily store a computer program to be executed by the arithmetic apparatus 21. The storage apparatus 22 may temporarily store data that are temporarily used by the arithmetic apparatus 21 when the arithmetic apparatus 21 executes the computer program. The storage apparatus 22 may store data that are stored by the information processing apparatus 2 for a long time. The storage apparatus 22 may include at least one of a RAM (Random Access Memory), a ROM (Read Only Memory), a hard disk apparatus, a magneto-optical disk apparatus, a SSD (Solid State Drive), and a disk array apparatus. That is, the storage apparatus 22 may include a non-transitory recording medium.

The communication apparatus 23 is configured to communicate with an apparatus external to the information processing apparatus 2 through a not-illustrated communication network. The communication apparatus 23 may be a communication interface based on a standard such as Ethernet (registered trademark), Wi-Fi (registered trademark), Bluetooth (registered trademark), and USB (Universal Serial Bus).

The input apparatus 24 is an apparatus that receives an input of information to the information processing apparatus 2 from an outside of the information processing apparatus 2. For example, the input apparatus 24 may include an operating apparatus (e.g., at least one of a keyboard, a mouse trackball, a touch panel, a pointing device such as a pen tablet, a button, and the like) that is operable by an operator of the information processing apparatus 2. For example, the input apparatus 24 may include a reading apparatus that is configured to read information recorded as data on a recording medium that is externally attachable to the information processing apparatus 2.

The output apparatus 25 is an apparatus that outputs information to the outside of the information processing apparatus 2. For example, the output apparatus 25 may output information as an image. That is, the output apparatus 25 may include a display apparatus (a so-called display) that is configured to display an image indicating the information that is desirably outputted. An example of the display apparatus may be a liquid crystal display, an OLED (Organic Light Emitting Diode) display, or the like. For example, the output apparatus 25 may output information as audio/sound. That is, the output apparatus 25 may include an audio apparatus (a so-called speaker) that is configured to output audio/sound. For example, the output apparatus 25 may output information onto a paper surface. That is, the output apparatus 25 may include a print apparatus (a so-called printer) that is configured to print desired information on the paper surface. The input apparatus 24 and the output apparatus 25 may be integrally formed as a touch panel.

The hardware configuration illustrated in FIG. 2 is an example. An apparatus other than the apparatus illustrated in FIG. 2 may be added, and a part of the apparatus may not be provided. In addition, a part of the apparatus may be replaced with another apparatus having a similar function. In addition, a part of the function in the second example embodiment may be provided by another apparatus through a network. The function in the second example embodiment may be distributed to and realized in a plurality of apparatuses. In this way, the hardware configuration illustrated in FIG. 2 may be changed as appropriate.

2-2: Fingerprint Pattern

The fingerprints of each finger of a human, including a newborn, may be classified into five types of fingerprint patterns, for example, Whorl (W), Double Loop (D), Left Loop (L), Right Loop (R), and Arch (A). The fingerprint pattern may represent an overall pattern of the fingerprints. The fingerprint pattern may be referred to as a fingerprint design.

Whorl (W) is a fingerprint pattern with deltas on the left and right of ring-shaped or spiral ridges. There is a circular pattern with no flow in a central part of the pattern, and there are deltas on both sides of the central part of the pattern. Depending on a fingerprint acquisition state, there may be only one delta. A term "sankakusu in Japanese" may be referred to as the delta.

Double Loop (D) is a fingerprint pattern with deltas on the left and right of double-loop-shaped ridges. There are circular patterns including flow in the central part of the pattern in a comma shape, and there are deltas on both sides of the central part of the pattern. Depending on the fingerprint acquisition state, there may be only one delta.

Left Loop (L) is a fingerprint pattern including loop lines and having deltas on the right side in the direction of flow of the loop lines. There is a pattern flowing from the left side towards the center of the pattern, and there is a delta on the right side of the direction of flow. Depending on the fingerprint acquisition state, there may be no delta. In the present example embodiment, the same terminology is used for the pattern in a left hand and the pattern in a right hand.

Right Loop (R) is a fingerprint pattern including loop lines and having deltas on the left side in the direction of flow of the loop lines. There is a pattern flowing from the right side towards the center of the pattern, and there is a delta on the left side of the direction of flow. Depending on the fingerprint acquisition state, there may be no delta. In the present example embodiment, the same terminology is used for the pattern in a left hand and the pattern in a right hand.

Arch (A) is a fingerprint pattern formed by arcuate lines. A delta pattern may appear in the center of the pattern, but in many cases, there is no delta in the pattern.

Alternatively, the first estimation unit 212 may determine which of six fingerprint patterns, i.e., the five types of fingerprint patterns and a fingerprint pattern of Unknown (UK), each of the fingerprint patterns of a plurality of fingerprint images is. When not capable of determining that the pattern of the fingerprint image is any one of the five fingerprint patterns, the first estimation unit 212 may determine that the pattern of the fingerprint image is "UK." The above five types of fingerprint patterns are an example, and another classification may be adopted. For example, the fingerprints may be classified into eight types of fingerprint patterns: P-arch (Plain Arch: PA), T-arch (Tented Arch: TA), U-loop (Ulnar Loop: UL), R-loop (Radial Loop: RL) D-loop (Double Loop: DL), P-whorl (Plain Whorl: PW), C-whorl (Central Pocket Loop Whorl: CW), and A-whorl (Accidental Whorl: AW).

2-3: Information Processing Operation Performed by Information Processing Apparatus 2

Figure 3:
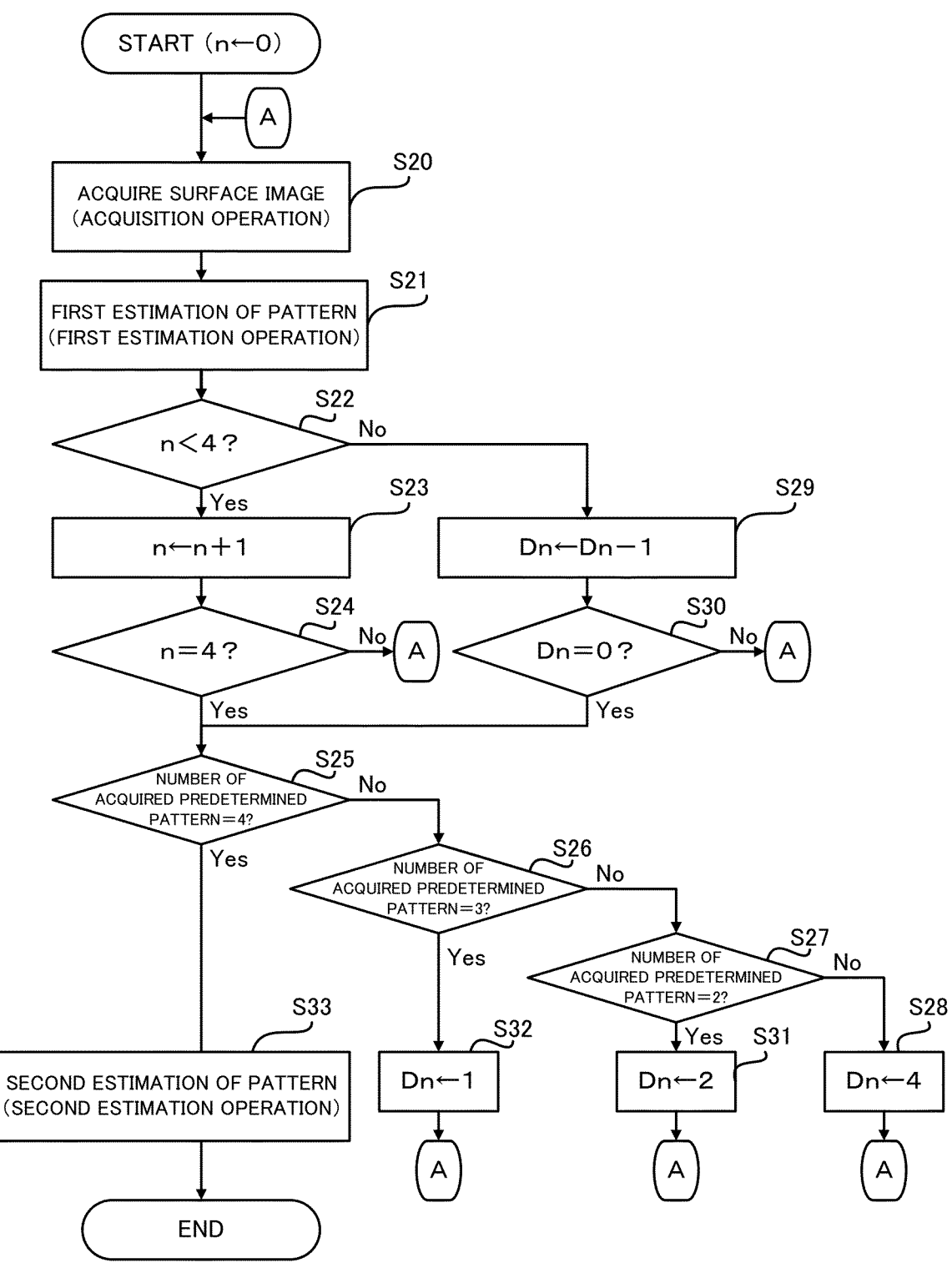
FIG. 3 is a flowchart illustrating a flow of an information processing operation performed by the information processing apparatus according to the second example embodiment.

With reference to FIG. 3, a flow of an information processing operation performed by the information processing apparatus 2 according to the second example embodiment will be described. FIG. 3 is a flowchart illustrating a flow of the information processing operation performed by the information processing apparatus 2 according to the second example embodiment. The information processing apparatus 2 according to the second example embodiment may estimate that the first pattern is a pattern of the fingerprints of the target person, when a predetermined number of surface images estimated to have the first pattern are acquired. In the second example embodiment, the predetermined number may be four. That is, in the second example embodiment, when four surface images estimated to have the same fingerprint pattern are acquired, the same fingerprint pattern may be estimated to be the pattern of the fingerprints. The predetermined number of acquired surface images may be any plurality of number. As the predetermined number is set to be larger, the accuracy of estimation of the fingerprints is improved.

As illustrated in FIG. 3, at the start of the information processing operation, n is set to zero. n is a variable to count the acquired surface images.

The acquisition unit 211 performs an acquisition operation of acquiring the surface image including the fingerprints of the target person (step S20). The acquisition operation may be an operation of acquiring the surface image obtained by imaging the fingerprints of a predetermined fingerprint of the target person. The target person may be a newborn. In the present example embodiment, the newborn may refer to a newborn baby within a few hours of birth. For example, in the present example embodiment, the newborn may refer to a baby within half a day of birth. In the present example embodiment, the newborn may particularly refer to a baby until a situation arises where it is necessary to identify the baby. The situation where it is necessary to identify the baby may be, for example, a situation where the infant moves from a place of birth (e.g., a hospital) to another place (e.g., home). The target person may be a newborn up to four weeks old, or an infant, a toddler, or an adult.

The fingerprint image taken from the surface of the finger may be used as stable biometric information that can be obtained from the newborn. The stable biometric information may refer to biometric information that is less likely to change as the newborn grows and that is usable to identify individuals. A pitch of the fingerprints of the newborn is very fine compared with that of an adult. Therefore, the acquisition unit 211 may acquire a high-resolution fingerprint image.

The first estimation unit 212 performs a first estimation operation of estimating the pattern of the fingerprints from the acquired surface image (step S21). The first estimation operation may be an operation of estimating which of a plurality of predetermined types of patterns the pattern of the fingerprints from the acquired surface image is. For example, the plurality of predetermined types of patterns may be the five types of fingerprint patterns of "W", "D", "L", "R", and "A". In this case, the first estimation operation may be an operation of estimating which fingerprint pattern of "W," "D," "L," "R," and "A" is the pattern of the fingerprints included in the surface image.

The first estimation unit 212 may estimate, by algorithm, which of the five types (or six types, or any type) of fingerprint patterns the pattern of the fingerprints from the acquired surface image is. The first estimation unit 212 may determine, by a determination model constructed by machine learning (e.g., a determination model using a neural network), which of the five types (or six types, or any type) of fingerprint patterns the pattern of the fingerprints from the acquired surface image is. The first estimation unit 212 may determine, by a determination model constructed by deep learning which is an example of the machine learning, which of the five types (or six types, or any type) of fingerprint patterns the pattern of the fingerprints from the acquired surface image is.

The estimation control unit 213 determines whether or not n is less than 4 serving as the predetermined number (step S22). When n is less than 4 (the step S22: Yes), the estimation control unit 213 adds 1 to n (step S23). The estimation control unit 213 determines whether or not n is 4 serving as the predetermined number (step S24). When n is less than 4 (the step S24: No), the flow returns to the step S20. The estimation control unit 213 performs control to repeat the step S20 to the step S24 a predetermined number of times until n becomes the predetermined number from 0.

When n is 4 serving as the predetermined number (the step S24: Yes), the estimation control unit 213 determines the number of acquired surface images with the first pattern (step S25 to step S27). In the second example embodiment, the first pattern may be a fingerprint pattern with the largest number of surface images estimated to have the same fingerprint pattern. For example, let us assume that the number of acquired surface images is 4, the number of surface images estimated to have the fingerprint pattern W is 1, the number of surface images estimated to have the fingerprint pattern D is 1, the number of surface images estimated to have the fingerprint pattern L is 1, and the number of surface images estimated to have the fingerprint pattern R is 1. In this case, the number of acquired surface images with the first pattern is 0, and the estimation control unit 213 determines No in the step S25, the step S26, and the step S27, and then, the flow proceeds to step S28. The estimation control unit 213 substitutes 4 into Dn (step S28), and the flow returns to the step S20. Dn may be a variable indicating the number of surface images to be acquired. That is, when the number of acquired surface images with the same fingerprint pattern is 0, four surface images may be acquired again to estimate the pattern.

After the determination in the step S24 is Yes, the determination in the step S22 is No. Therefore, after the step S20, the step S21, and the step S22, the process proceeds to step S29. The estimation control unit 213 subtracts 1 from Dn (step S29), and determines whether or not Dn is 0 (step S30). The estimation control unit 213 repeats the step S20, the step S21, the step S22, the step S29, and the step S30 until Dn becomes 0.

After the step S28, four surface images are newly acquired. Therefore, there are eight acquired surface images in the second step S25. For example, let us assume that the number of surface images estimated to have the fingerprint pattern W is 3, the number of surface images estimated to have the fingerprint pattern D is 2, the number of surface images estimated to have the fingerprint pattern L is 2, and the number of surface images estimated to have the fingerprint pattern R is 1. In this instance, since the first surface is the fingerprint pattern W, the number of acquire surface images with the first pattern is 3. The estimation control unit 213 determines No in the step S25 and determines Yes in the step S26, and the flow proceeds to step S32. The estimation control unit 213 substitutes 1 into Dn (step S32), and the flow returns to the step S20. The estimation control unit 213 performs the step S20, the step S21, the step S22, the step S29, and the step S30 once, and the flow proceeds to the step S25.

When the step S32 is performed after the step S28, one surface image is newly acquired. Therefore, there are nine acquired surface images in the third step S25. For example, let us assume that the number of surface images estimated to have the fingerprint pattern W is 4, the number of surface images estimated to have the fingerprint pattern D is 2, the number of surface images estimated to have the fingerprint pattern L is 2, and the number of surface images estimated to have the fingerprint pattern R is 1. In this instance, since the first surface is the fingerprint pattern W, the number of acquire surface images with the first pattern is 4. The estimation control unit 213 determines Yes in the step S25, and the flow proceeds to step S33. That is, the information processing apparatus 2 repeats the processing of acquiring the surface image of the finger of the target person and estimating the fingerprint pattern of the fingerprints from the acquired surface image, until the number of surface images estimated to have the first pattern out of the estimated fingerprint patterns reaches the predetermined number.

The second estimation unit 214 performs a second estimation operation of estimating that the first pattern is the pattern of the fingerprints of the target person when the predetermined number of surface images estimated by the first estimation unit 212 to have the first pattern are acquired (step S33). In the second example embodiment, the second estimation unit 214 estimates that the first pattern in which the number of surface images estimated to have the first pattern reaches the predetermined number is the pattern of the fingerprints of the target person.

In the determination in the step S25 to the step S27, when the number of acquired surface images with the first pattern is 2 (the step S25: No, the step S26: No, and the step S27: Yes), the flow proceeds to the step S31, and the estimation control unit 213 substitutes 2 in Dn (step S31), and then, the flow returns to the step S20. Even in this case, the estimation control unit 213 repeats the step S20, the step S21, the step S22, the step S29, and the step S30 until Dn becomes 0.

That is, the estimation control unit 213 controls the acquisition unit 211 and the first estimation unit 212 to repeat the acquisition operation (the step S20) and the first estimation operation (the step S21) until the predetermined number of surface images estimated by the first estimation unit 212 to have the first pattern are acquired.

The five types of fingerprint patterns described above are merely an example. The fingerprints may be classified into more than the five types, for example, twenty or more types of fingerprint patterns. Alternatively, the fingerprints may be classified into three types of print patterns: e.g., a first print pattern excluding a delta, a second print pattern including one delta, and a third print pattern including two deltas. Alternatively, the fingerprints may be classified into two types of fingerprint patterns: e.g., a non-delta fingerprint pattern excluding a delta, and a delta fingerprint pattern including a delta. When the classification number is reduced, it is possible to reduce errors in the pattern estimation.

For example, a user may specify the classification number of fingerprints according to a usage requirement of information about the newborn. In this case, the first estimation unit 212 may estimate which of the user-specified number of types of fingerprint patterns the fingerprint pattern is.

The "acquiring unit" described in Supplementary Note later may be an imaging part (or imaging unit). That is, the information processing apparatus 2 may be an image capturing apparatus, and it may alternately and repeatedly perform first processing of capturing the surface image including the fingerprints of the target person and second processing of estimating the pattern of the fingerprints from the captured surface image, and may end the repetition when the predetermined number of surface images estimated to include the first pattern out of the plurality of estimated patterns are captured. In this instance, the image capturing apparatus serving as the information processing apparatus may include a plurality of imaging parts (or imaging units) serving as the "acquisition unit." Each of the acquisition units may acquire the surface image of a different finger. The surface image may be a fingerprint image. This enables faster processing when a plurality of surface images of a plurality of fingers are acquired.

2-4: Modified Example

As a modified example of the present example embodiment, even when a condition of the acquisition number is satisfied, the estimation control unit 213 may repeatedly perform the processing, until a difference in the acquired number between the largest acquisition number of fingerprint patterns and the second largest acquisition number of fingerprint patterns becomes the predetermined number, thereby determining the first pattern. In this case, when the difference in the acquired number between the largest acquisition number of fingerprint patterns and the second largest acquisition number of fingerprint patterns is large and advantageous, it can be considered that the fingerprint pattern of the largest acquisition number is the fingerprint pattern of the target person, and it is possible to perform highly accurate estimation.

2-5: Technical Effect of Information Processing Apparatus 2

Since the body surface of the newborn shortly after birth is covered with sebum, amniotic fluid, and the like, it is usually hard to accurately estimate the pattern of the fingerprints of the newborn. Especially, when the birth takes place in a situation where postpartum care tends to be inadequate in inadequate medical facilities, it is hard to accurately estimate the pattern of the fingerprints of the newborn in many cases. Alternatively, in a case where sebum, amniotic fluid, and other adhesions are not removed in consideration of the health of the newborn, it is often hard to accurately estimate the pattern of the fingerprints of the newborn.

In contrast, the information processing apparatus 2 according to the second example embodiment performs the second estimation operation of estimating that the first pattern is the pattern of the fingerprints of the target person when the predetermined number of surface images estimated to have the first pattern are acquired, and it is thus possible to perform highly accurate estimation. The predetermined number may be a number that allows the determination that the estimation is probable. Therefore, the case where the predetermined number of surface images estimated to have the first pattern are acquired, is a case where a number of surface images that allows the determination that the estimation is probable are acquired, and thus, the information processing apparatus 2 is capable of performing highly accurate estimation.

3: Third Example Embodiment

An information processing apparatus, an information processing method, and a recording medium according to a third example embodiment will be described. The following describes the information processing apparatus, the information processing method, and the recording medium according to the third example embodiment, by using an information processing apparatus 3 to which the information processing apparatus, the information processing method, and the recording medium according to the third example embodiment are applied.

3-1: Configuration of Information Processing Apparatus 3

Figure 4:
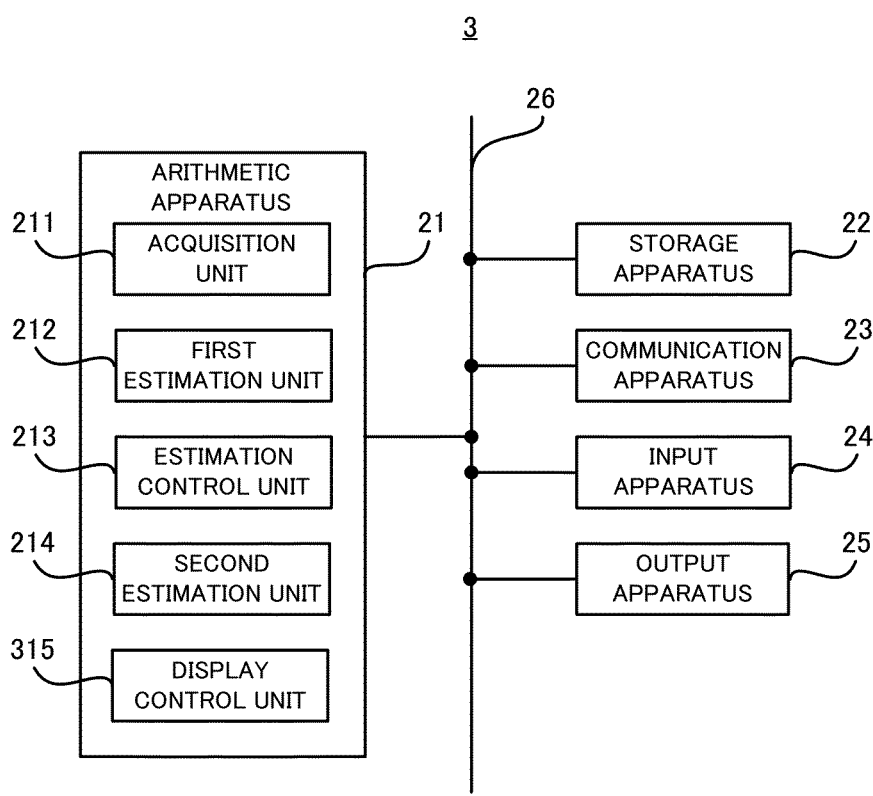
FIG. 4 is a block diagram illustrating a configuration of an information processing apparatus according to a third example embodiment.

With reference to FIG. 4, a configuration of the information processing apparatus 3 according to the third example embodiment will be described. FIG. 4 is a block diagram illustrating the configuration of the information processing apparatus 3 according to the third example embodiment.

As illustrated in FIG. 4, the information processing apparatus 3 according to the third example embodiment includes the arithmetic apparatus 21 and the storage apparatus 22, as in the information processing apparatus 2 according to the second example embodiment. Furthermore, the information processing apparatus 3 may include the communication apparatus 23, the input apparatus 24, and the output apparatus 25, as in the information processing apparatus 2 according to the second example embodiment. The information processing apparatus 3, however, may not include at least one of the communication apparatus 23, the input apparatus 24, and the output apparatus 25. The information processing apparatus 3 according to the third example embodiment is different from the information processing apparatus 2 according to the second example embodiment, in that the arithmetic apparatus 21 further includes a display control unit 315. In the third example embodiment, the output apparatus 25 includes a display apparatus (a so-called display) that is configured to display the information that is desirably outputted. The display control unit 315 allows the display apparatus to display a display screen D including information about a control operation of the estimation control unit 213. The control operation of the estimation control unit 213 is an operation of repeating the acquisition operation and the first estimation operation until the predetermined number of surface images estimated to have the first pattern are acquired. The information about the control operation of the estimation control unit 213 includes information about the number of surface images estimated to have the same pattern. The information processing apparatus 3 may provide a manager/administrator of the information processing apparatus 3 with the information about the control operation of the estimation control unit 213 as information for notifying the manager of progress of the information processing operation of the information processing apparatus 3.

Other features of the information processing apparatus 3 may be the same as those of the information processing apparatus 2 according to the second example embodiment. For this reason, a part that is different from each of the example embodiments described above will be described in detail below, and a description of the other overlapping parts will be omitted as appropriate.

3-2: Information Processing Operation Performed by Information Processing Apparatus 3

Figure 5:
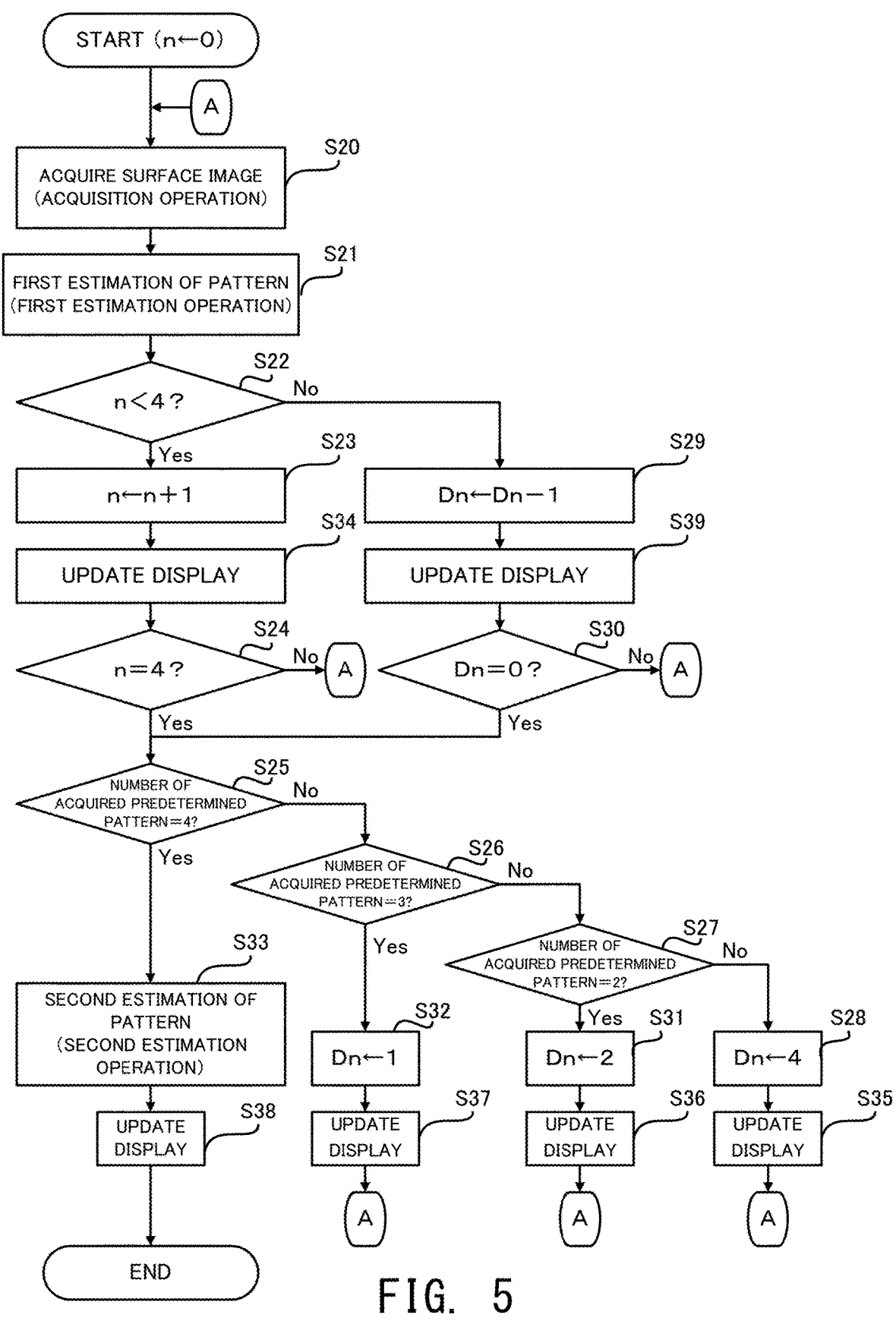
FIG. 5 is a flowchart illustrating a flow of an information processing operation performed by the information processing apparatus according to the third example embodiment.

With reference to FIG. 5 and FIGS. 6A to 6K, an information processing operation performed by the information processing apparatus 3 according to the third example embodiment will be described. FIG. 5 is a flowchart illustrating a flow of the information processing operation performed by the information processing apparatus 3 according to the third example embodiment. FIGS. 6A to 6K is diagrams illustrating display examples of the display screen D.

As illustrated in FIG. 5, the information processing apparatus 3 according to the third example embodiment is different from the information processing apparatus 2 in the second example embodiment, in that it performs a display updating operation after the step S23, the step S28, the step S31, the step S32, step S33, and the step S29.

Figure 6A:
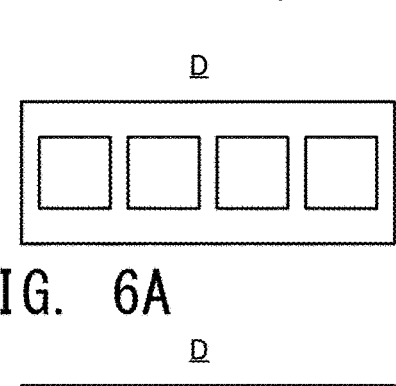
FIG. 6A is diagrams illustrating display examples of a display screen by the information processing apparatus according to the third example embodiment.

FIG. 6A illustrates an example of the display screen D when the information processing operation illustrated in FIG. 5 is started. The predetermined number may be 4 in the third example embodiment, and the display control unit 315 may allow the display of the display screen D including four boxes as the predetermined number. The display control unit 315 may express the number of acquired surface images by the number of check marks. In other words, the display control unit 315 may express the number of surface images to be acquired from now, by the number of boxes without checkmarks. That is, the display control unit 315 may allow the display of the display screen D including the box without checkmarks, thereby encouraging the manager of the information processing apparatus 3 to collect the surface image including the fingerprints of the target person. The manager of the information processing apparatus 3 may be a person who collects the surface image including the fingerprints of the target person and inputs it to the information processing apparatus 3. In such a case, the acquisition unit 211 acquires the inputted surface image.

Figure 6B:
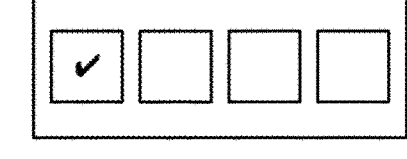
FIG. 6B is diagrams illustrating display examples of a display screen by the information processing apparatus according to the third example embodiment.

By the operation in the step S34 after the first acquisition operation, the display control unit 315 may update the display screen D illustrated in FIG. 6A to the display screen D illustrated in FIG. 6B. By the operation in the step S34 after the second acquisition operation, the display control unit 315 may update the display screen D illustrated in FIG. 6B to the display screen D illustrated in FIG. 6C. By the operation in the step S34 after the third acquisition operation, the display control unit 315 may update the display screen D illustrated in FIG. 6C to the display screen D illustrated in FIG. 6D. By the operation in the step S34 after the fourth acquisition operation, the display control unit 315 may update the display screen D illustrated in FIG. 6D to the display screen D illustrated in FIG. 6E.

When the acquisition of the four surface images is completed, wherein four is the predetermined number (the step S24: Yes), the display control unit 315 updates the display screen D according to a determination result of the number of acquired surface images with the first pattern.

When the number of acquired surface images with the first pattern is less than 2 (the step S25: No, the step S26: No, the step S27: No), the display control unit 315 may update the display screen D illustrated in FIG. 6E to the display screen D illustrated in FIG. 6A (step S35). That is, the display control unit 315 may allow the display of the display screen D including information for having the manager of the information processing apparatus 3 understand that four sheets of surface images need to be acquired.

Figure 6C:
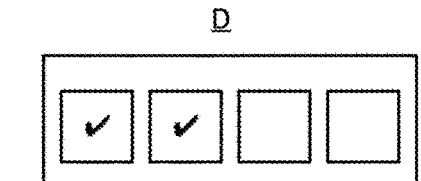
FIG. 6C is diagrams illustrating display examples of a display screen by the information processing apparatus according to the third example embodiment.
Figure 6D:
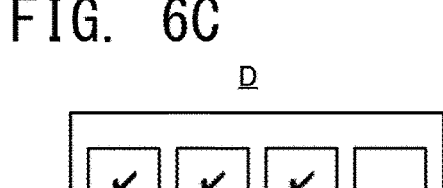
FIG. 6D is diagrams illustrating display examples of a display screen by the information processing apparatus according to the third example embodiment.
Figure 6E:
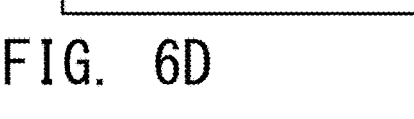
FIG. 6E is diagrams illustrating display examples of a display screen by the information processing apparatus according to the third example embodiment.
Figure 6F:
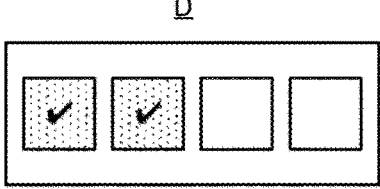
FIG. 6F is diagrams illustrating display examples of a display screen by the information processing apparatus according to the third example embodiment.
Figure 6G:
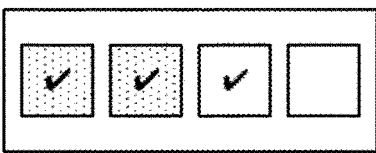
FIG. 6G is diagrams illustrating display examples of a display screen by the information processing apparatus according to the third example embodiment.
Figure 6H:
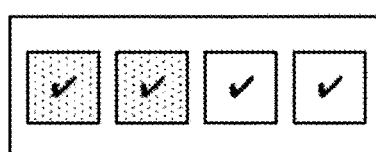
FIG. 6H is diagrams illustrating display examples of a display screen by the information processing apparatus according to the third example embodiment.
Figure 6I:
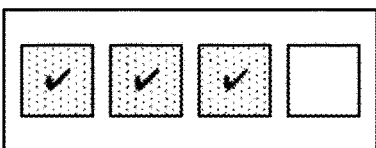
FIG. 6I is diagrams illustrating display examples of a display screen by the information processing apparatus according to the third example embodiment.
Figure 6J:
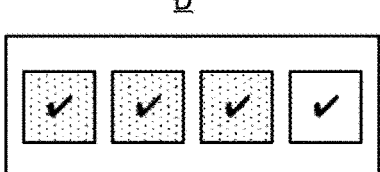
FIG. 6J is diagrams illustrating display examples of a display screen by the information processing apparatus according to the third example embodiment.
Figure 6K:
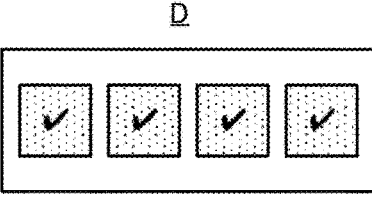
FIG. 6K is diagrams illustrating display examples of a display screen by the information processing apparatus according to the third example embodiment.

In this case, in subsequent step S39, the display control unit 315 may sequentially update the display screen D illustrated in FIG. 6A to the display screen D illustrated in FIG. 6B, update the display screen D illustrated in FIG. 6B to the display screen D illustrated in FIG. 6C, update the display screen D illustrated in FIG. 6C to the display screen D illustrated in FIG. 6D, and update the display screen D illustrated in FIG. 6D to the display screen D illustrated in FIG. 6E.

When the number of acquired surface images with the first pattern is 2 (the step S25: No, the step S26: No, the step S27: Yes), the display control unit 315 may update the display screen D illustrated in FIG. 6E to the display screen D illustrated in FIG. 6F (step S36). The display control unit 315 may express the number of valid surface images by shading the boxes. That is, the display control unit 315 may allow the display of the display screen D including information informing the manager that two sheets of surface images with the first pattern are already acquired and two more sheets of surface images with the first pattern are necessary. In this case, in the subsequent step S39, the display control unit 315 may sequentially update the display screen D illustrated in FIG. 6F to the display screen D illustrated in FIG. 6G and update the display screen D illustrated in FIG. 6G to the display screen D illustrated in FIG. 6H.

When the number of acquired surface images with the first pattern is 3 (the step S25: No, the step S26: Yes), the display control unit 315 may update the display screen D illustrated in FIG. 6E to the display screen D illustrated in FIG. 6I (step S37). The display control unit 315 may allow the display of the display screen D including information informing the manager that three sheets of surface images with the first pattern are already acquired and one more sheet of surface images with the first pattern is necessary. In this instance, in the subsequent steps S39, the display control unit 315 may update the display screen D illustrated in FIG. 6I to the display screen D illustrated in FIG. 6J.

When the number of acquired surface images with the first pattern is 4 (the step S25: Yes), the display control unit 315 may update the display screen D illustrated in FIG. 6E to the display screen D illustrated in FIG. 6K (step S38). The display screen D may be a screen informing the manager that four sheets of surface images with the first pattern are already acquired and all the required surface images are acquired.

3-3: Technical Effect of Information Processing Apparatus 3

Since the information processing apparatus 3 according to the third example embodiment allows the display apparatus to display the display screen including the information about the control operation, for example, the manager of the information processing apparatus 3 is able to visually understand a state of the information processing by the information processing apparatus 3. Furthermore, since the information about the control operation includes the information about the number of surface images estimated to have the same pattern, the manager of the information processing apparatus 3 is able to know a state of the progress of the information processing operation by the information processing apparatus 3.

4: Fourth Example Embodiment

An information processing apparatus, an information processing method, and a recording medium according to a fourth example embodiment will be described. The following describes the information processing apparatus, the information processing method, and the recording medium according to the fourth example embodiment, by using an information processing apparatus 4 to which the information processing apparatus, the information processing method, and the recording medium according to the fourth example embodiment are applied.

4-1: Configuration of Information Processing Apparatus 4

Figure 7:
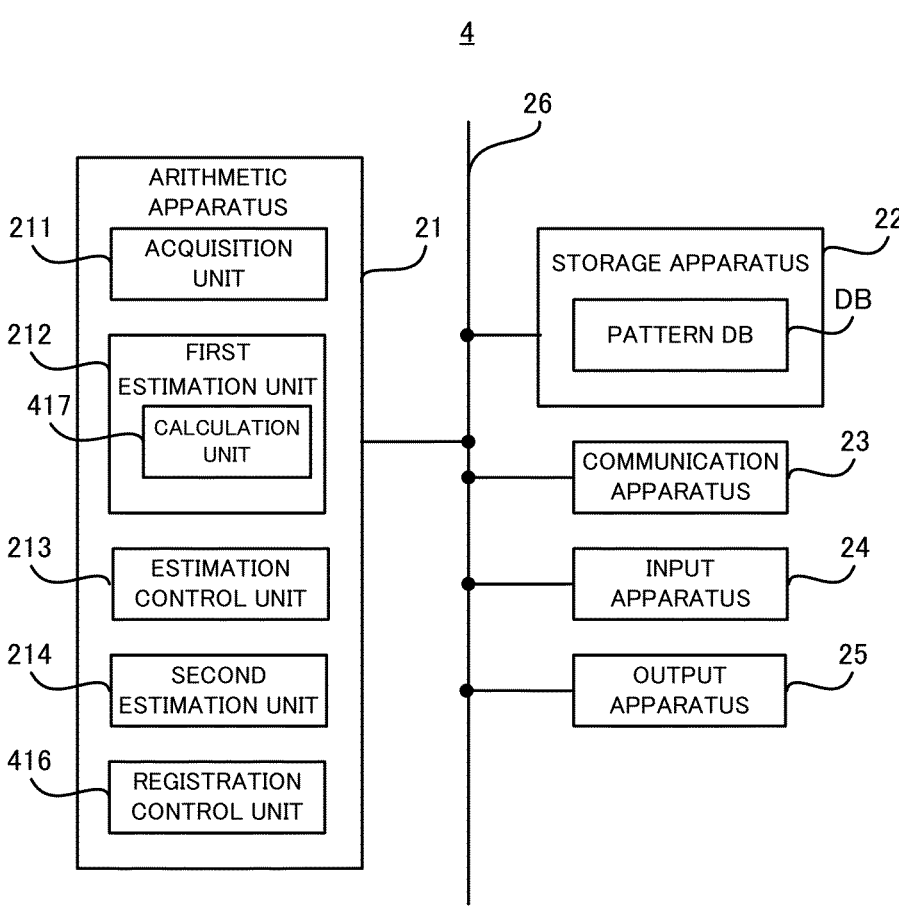
FIG. 7 is a block diagram illustrating a configuration of an information processing apparatus according to a fourth example embodiment.

With reference to FIG. 7, a configuration of the information processing apparatus 4 according to the fourth example embodiment will be described. FIG. 7 is a block diagram illustrating the configuration of the information processing apparatus 4 according to the fourth example embodiment.

As illustrated in FIG. 7, the information processing apparatus 4 according to the fourth example embodiment includes the arithmetic apparatus 21 and the storage apparatus 22, as in the information processing apparatus 2 according to the second example embodiment and the information processing apparatus 3 according to the third example embodiment. Furthermore, the information processing apparatus 4 may include the communication apparatus 23, the input apparatus 24, and the output apparatus 25, as in the information processing apparatus 2 according to the second example embodiment and the information processing apparatus 3 according to the third example embodiment. The information processing apparatus 4, however, may not include at least one of the communication apparatus 23, the input apparatus 24, and the output apparatus 25. The information processing apparatus 4 according to the fourth example embodiment is different from the information processing apparatus 2 according to the second example embodiment and the information processing apparatus 3 according to the third example embodiment, in that the arithmetic apparatus 21 further includes a registration control unit 416, the first estimation unit 212 includes a calculation unit 417, and the storage apparatus 22 includes a pattern database DB. The pattern database DB may be a database that stores finger information in which information indicating the pattern of the fingerprints of the target person is associated with the surface image of the pattern of the fingerprints of the target person. The pattern database DB, however, may be realized or implemented in a storage mechanism other than the storage apparatus 22. For example, the information processing apparatus 4 may be an edge server provided for each hospital. In such a case, the pattern database DB may be realized or implemented in a storage apparatus provided in a cloud server. In this case, a plurality of edge servers may perform registration control in the pattern database DB. Other features of the information processing apparatus 4 may be the same as those of the information processing apparatus 2 according to the second example embodiment and the information processing apparatus 3 according to the second example embodiment. For this reason, a part that is different from each of the example embodiments described above will be described in detail below, and a description of the other overlapping parts will be omitted as appropriate.

4-2: Information Processing Operation Performed by Information Processing Apparatus 4

Figure 8:
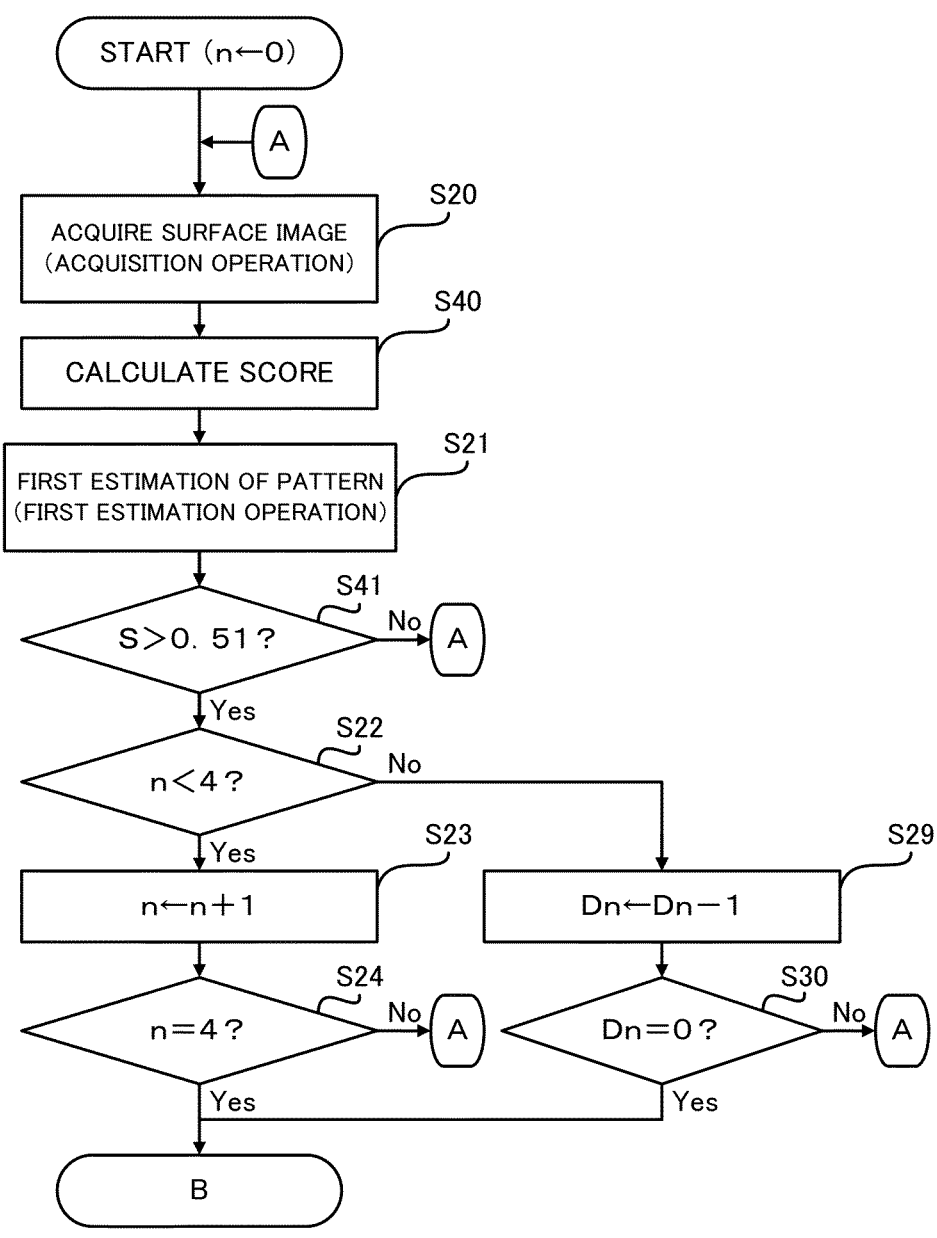
FIG. 8 is a flowchart illustrating a flow of an information processing operation performed by the information processing apparatus according to the fourth example embodiment.
Figure 9:
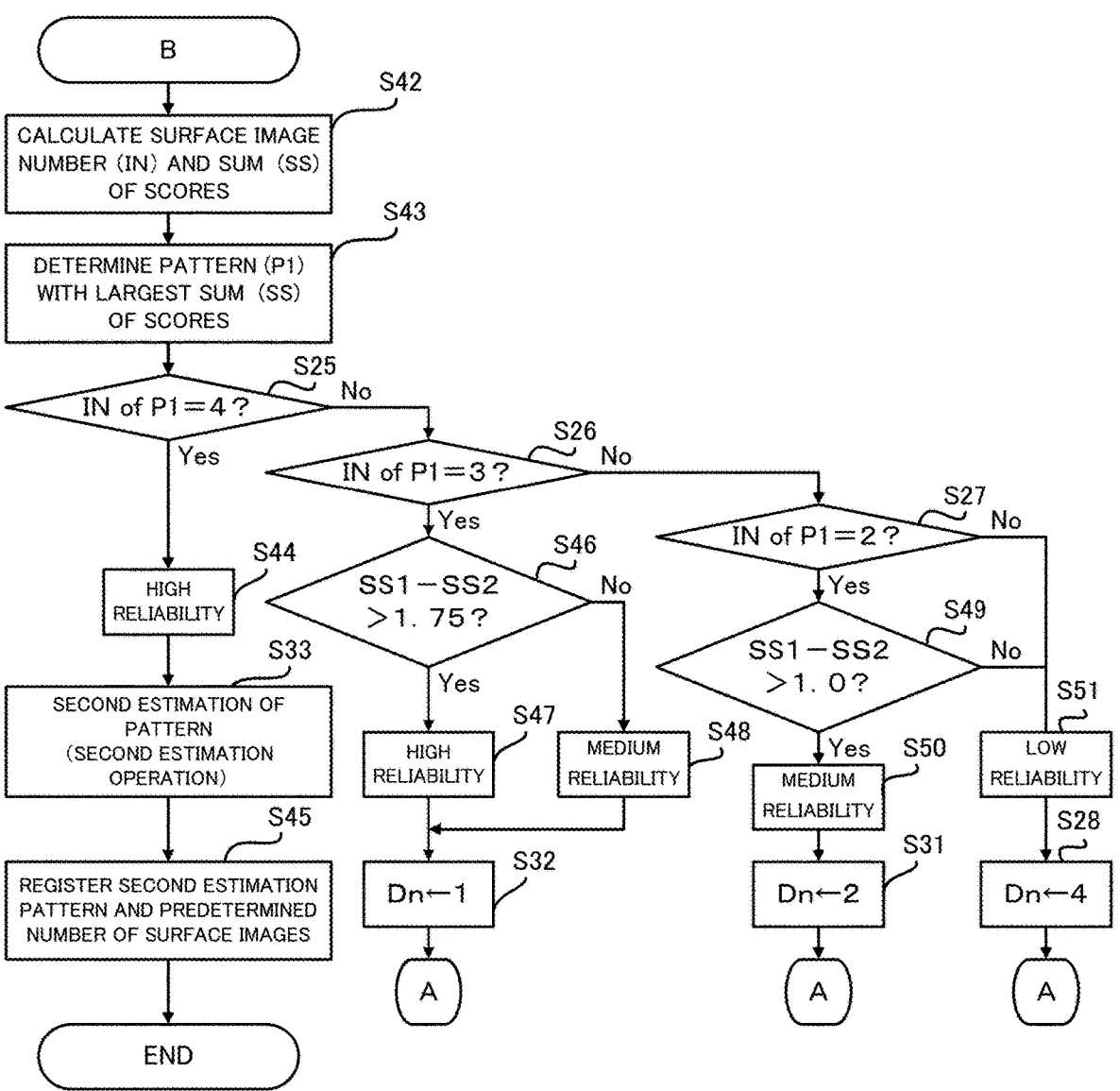
FIG. 9 is a flowchart illustrating a flow of an information processing operation performed by the information processing apparatus according to the fourth example embodiment.

With reference to FIG. 8 and FIG. 9, an information processing operation performed by the information processing apparatus 4 according to the fourth example embodiment will be described. FIG. 8 and FIG. 9 are flowcharts illustrating a flow of the information processing operation performed by the information processing apparatus 4 according to the fourth example embodiment.

As illustrated in FIG. 8, in the fourth example embodiment, after the acquisition operation in the step S20, the calculation unit 417 performs a calculation operation of calculating a score indicating a possibility that the pattern in the surface image is each of the plurality of predetermined types of fingerprint patterns (step S40). In other words, the calculation unit 417 calculates probability that the pattern in the surface image is at least any one of the plurality of predetermined types of fingerprint patterns.

As an example, the calculation unit 417 may calculate the possibility that the pattern in the surface image is each of the plurality of types of fingerprint patterns, as the score included in a range of 0 or more and 1 or less. In this case, it may be considered that the calculation unit 417 calculates the score indicating, as a probability of 0% to 100%, a possibility of the pattern in the surface image being one type of fingerprint pattern.

In the fourth example embodiment, the first estimation unit 212 estimates, based on the score calculated by the calculation unit 417, which of the plurality of types of fingerprint patterns the pattern in the surface image is (step S21). The first estimation unit 212 may estimate that the fingerprint pattern with the highest score is the most probable as the pattern in the surface image. The first estimation unit 212 may use the highest score as a score(S) of the surface image.

The calculation unit 417 determines whether or not the score(S) of the surface image exceeds a predetermined score threshold (step S41). When the score(S) of the surface image exceeds the predetermined score threshold, the first estimation unit 212 performs the step S22 to the step S24, the step S29, and the step S30 in the same manner as in the second example embodiment. That is, in the fourth example embodiment, when the score(S) of the surface image exceeds the score threshold, the first estimation unit 212 may use the acquired surface image as a subsequent processing target.

The predetermined score threshold may be 0.51. In this case, the first estimation unit 212 may determine whether or not the score(S) of the surface image exceeds 0.51. When the score(S) of the surface image exceeds 0.51, the first estimation unit 212 may use the acquired surface image as the subsequent processing target. In other words, the first estimation unit 212 may use the acquired surface image as the subsequent processing target when the possibility of being the most probable fingerprint pattern as the pattern in the surface image exceeds 51%. When the predetermined score is set to 0.51, it is possible to set the surface image in which pattern is accurately estimated, as the subsequent processing target.

When the score(S) of the surface image is less than 0.51, the flow returns to the step S20. In this case, the first estimation unit 212 may discard the acquired surface image.

As illustrated in FIG. 9, the first estimation unit 212 calculates the number of surface images estimated to have the fingerprint pattern, i.e., a surface image number (IN), for each of the plurality of predetermined types of fingerprint patterns, and calculates a sum of scores (SS) of the surface images estimated to have the fingerprint pattern (step S42).

The second estimation unit 214 determines a fingerprint pattern (P1) with the largest sum of scores (SS) of the surface images estimated to have the same fingerprint pattern (step S43). In the fourth example embodiment, the fingerprint pattern (P1) with the largest sum of scores (SS) is also referred to as the first pattern.

The second estimation unit 214 determines whether or not the surface image number (IN) corresponding to the first pattern is 4 serving as the predetermined number (step S25).

When the surface image number (IN) corresponding to the first pattern is 4 serving as the predetermined number (the step S25: Yes), the second estimation unit 214 estimates that the first pattern has high reliability (step S44). The second estimation unit 214 estimates that the first pattern is the pattern of the fingerprints of the target person (step S33).

The registration control unit 416 registers the finger information in which the information indicating the first pattern is associated with the predetermined number of surface images estimated to have the first pattern (step S45). The registration control unit 416 deletes a surface image other than the predetermined number of surface images estimated to have the first pattern, among a plurality of surface images acquired by the acquisition unit 211 until the predetermined number of surface images estimated by the first estimation unit 212 to have the first pattern are acquired. The deletion of the surface image may be an operation of deleting/eliminating, from the storage apparatus 22, the surface image temporarily stored by the storage apparatus 22 and disabling it in the subsequent processing. The registration control unit 416 may discard a surface image that is not estimated to have the first pattern, in order to eliminate fluctuation in estimated values and increase the estimation accuracy by storing surface images indicating different patterns of the surface images acquired by acquisition unit 211. The registration control unit 416 may register only the predetermined number of surface images estimated to have the first pattern, in association with the information indicating the first pattern.

For example, in a case where four sheets are defined as the predetermined number, when three sheets of surface images are estimated to have the first pattern and one sheet of surface image are determined to have a second pattern, another surface image is additionally acquired. When the additionally acquired surface image is estimated to have the first pattern, there are four sheets of surface images with the first pattern and one sheet of surface image determined to have the second pattern. In this instance, since the number of surface images with the first pattern reaches four, the surface image with the second pattern is discarded as an unnecessary surface image, and the four sheets of surface images with the first pattern are registered.

For example, the predetermined number of surfaces images estimated to have the first pattern registered in association with the information indicating the first pattern by the registration control unit 416, may be used for machine learning of the determination model described above. That is, the surface image registered by the registering control unit 416 may be used as a sample of the surface image of the finger of the newborn with the first pattern. For example, let us assume that a surface image without the first pattern (i.e., a surface image with a pattern dissimilar to the first pattern, e.g., the surface image with the second pattern) is registered in association with the information indicating the first pattern. When the surface image with the pattern dissimilar to the first pattern that is associated with the information indicating the first pattern is used for machine learning, it may be disadvantageous to improve the probability of determination of the determination model. In the present example embodiment, after the probability satisfies a condition for determining the pattern of the fingerprints of the target person, the surface image with a pattern different from the determined pattern of the patterns acquired by the acquisition operation and the calculating operation, is deleted. It is therefore possible to improve the accuracy of the estimation.

When the surface image number (IN) corresponding to the first pattern is not 4 (the step S25: No), the second estimation unit 214 determines whether or not the surface image number (IN) corresponding to the first pattern is 3 (step S26).

When the surface image number (IN) corresponding to the first pattern is 3 serving as the predetermined number (the step S26: Yes), the second estimation unit 214 determines whether or not a difference between a sum of scores (SS1) and a sum of scores (SS2) exceeds 1.75, wherein the sum of scores (SS1) correspond to the first pattern and the sum of scores (SS2) correspond to a pattern with the second largest sum of scores (step S46).

When the difference exceeds 1.75 (the step S46: Yes), the second estimation unit 214 estimates that the first pattern has high reliability (step S47). On the other hand, when the difference is less than or equal to 1.75 (the step S46: No), the second estimation unit 214 estimates that the first pattern has medium reliability (step S48). That is, when the number (IN) of surface images corresponding to the pattern (first pattern) with the largest sum of scores of the surface images estimated to have the same pattern, is less than 4 serving as the predetermined number and when the difference is greater than or equal to the threshold between the sum of scores (SS1) corresponding to the pattern with the largest sum of scores and the sum of scores (SS2) corresponding to the pattern with the second largest sum of scores, the second estimation unit 214 estimates the reliability of the pattern with the largest sum of scores, to be higher than that in a case where the difference is less than the threshold.

When the surface image number (IN) corresponding to the first pattern is not 3 (the step S26: No), the second estimation unit 214 determines whether or not the surface image number (IN) corresponding to the first pattern is 2 (step S27).

When the surface image number (IN) corresponding to the first pattern is 2 serving as the predetermined number (the step S27: Yes), the second estimation unit 214 determines whether or not the difference between the sum of scores (SS1) and the sum of scores (SS2) exceeds 1.0, wherein the sum of scores (SS1) correspond to the first pattern and the sum of scores (SS2) correspond to the pattern in which the sum of scores is the second largest pattern (step S49).

When the difference exceeds 1.0 (the step S49: Yes), the second estimation unit 214 estimates that the first pattern has medium reliability (step S50). On the other hand, when the difference is less than or equal to 1.0 (the step S49: No), the second estimation unit 214 estimates that the first pattern has low reliability (step S51).

The estimation control unit 213 controls the calculation unit 417 to repeat the acquisition operation and the calculation operation until the probability satisfies the condition for determining the pattern of the fingerprints of the target person. The condition for determining the pattern of the fingerprints of the target person may include at least one of a case where the number of surface images with the first pattern is the predetermined number and a case where the difference of the sum of scores exceeds the threshold. For example, the estimation control unit 213 may perform the step S33 after the step S47. That is, even when the number of surface images with the first pattern is less than the predetermined number, an aspect for determining the pattern of the fingerprints of the target person may be adopted. That is, the information processing apparatus 4 may acquire the surface image of the finger of the target person, may calculate from the captured surface image the probability that the fingerprint has at least any one of the plurality of patterns, and may repeatedly determine whether the probability satisfies the condition for determining the pattern while the condition is not satisfied.

The finger information registered in the pattern database DB may be integrated in the future, for example, into a national information DB in which information managed by a country for identifying the whole nation is registered.

4-3: Technical Effect of Information Processing Apparatus 4

Since the information processing apparatus 4 according to the fourth example embodiment estimates the reliability and estimates the pattern based on the reliability, it is possible to estimate the pattern with higher accuracy. Furthermore, since the information processing apparatus 4 registers the surface image with the estimated pattern, it is possible to improve the accuracy of the first estimation operation.

5: Fifth Example Embodiment

An information processing apparatus, an information processing method, and a recording medium according to a fifth example embodiment will be described. The following describes the information processing apparatus, the information processing method, and the recording medium according to the fifth example embodiment, by using an information processing apparatus to which the information processing apparatus, the information processing method, and the recording medium according to the fifth example embodiment are applied.

5-1: Configuration of Information Processing Apparatus 5

Figure 10:
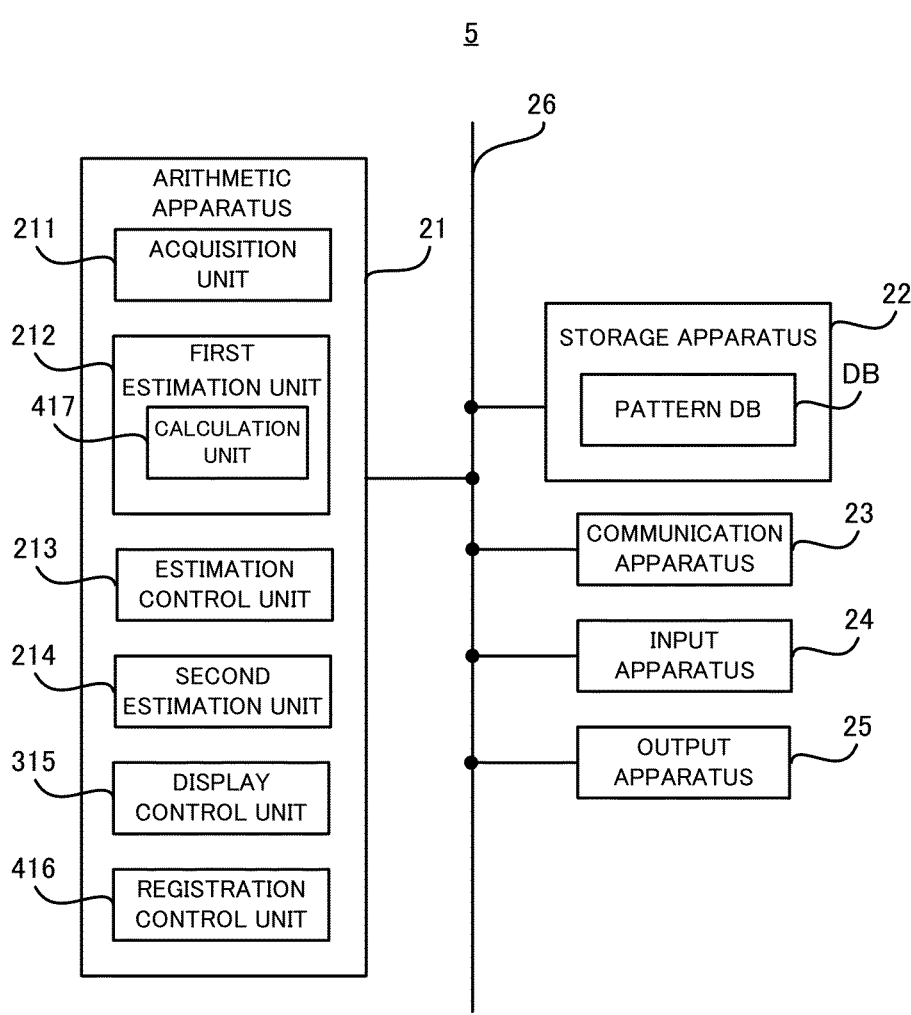
FIG. 10 is a block diagram illustrating a configuration of an information processing apparatus according to a fifth example embodiment.

With reference to FIG. 10, a configuration of the information processing apparatus 5 according to the fifth example embodiment will be described. FIG. 10 is a block diagram illustrating the configuration of the information processing apparatus 5 according to the fifth example embodiment.

As illustrated in FIG. 10, the information processing apparatus 5 according to the fifth example embodiment includes the arithmetic apparatus 21 and the storage apparatus 22, as in the information processing apparatus 2 according to the second example embodiment to the information processing 4 according to the fourth example embodiment. Furthermore, the information processing apparatus 5 may include the communication apparatus 23, the input apparatus 24, and the output apparatus 25, as in the information processing apparatus 2 according to the second example embodiment to the information processing apparatus 4 according to the fourth example embodiment. The information processing apparatus 5, however, may not include at least one of the communication apparatus 23, the input apparatus 24, and the output apparatus 25.

The information processing apparatus 5 according to the fifth example embodiment is different from the information processing apparatus 2 according to the second example embodiment and the information processing apparatus 3 according to the third example embodiment, in that the arithmetic apparatus 21 further includes the registration control unit 416, the first estimation unit 212 includes the calculation unit 417, and the storage apparatus 22 includes the pattern database DB. The information processing apparatus 5 according to the fifth example embodiment is different from the information processing apparatus 2 according to the second example embodiment and the information processing apparatus 4 according to the fourth example embodiment, in that the arithmetic apparatus 21 further includes the display control unit 315. That is, the information processing apparatus 5 according to the fifth example embodiment is capable of displaying the reliability of the estimated pattern on the display screen D. Other features of the information processing apparatus 5 may be the same as those of at least one of the information processing apparatus 2 according to the second example embodiment to the information processing apparatus 4 according to the fourth example embodiment. For this reason, a part that is different from each of the example embodiments described above will be described in detail below, and a description of the other overlapping parts will be omitted as appropriate.

5-2: Information Processing Operation Performed by Information Processing Apparatus 5

With reference to FIGS. 11A to 11E, an information processing operation performed by the information processing apparatus 5 according to the fifth example embodiment will be described. FIGS. 11A to 11E is diagrams illustrating display examples of the display screen D.

As illustrated in FIGS. 11A to 11E, the information processing apparatus 5 according to the fifth example embodiment is capable of performing both the estimation of the reliability and the display of the reliability.

As in the fourth example embodiment, even in the fifth example embodiment, the calculation unit 417 calculates the score indicating the possibility that the pattern in the surface image is each of the plurality of predetermined types of fingerprint patterns. The first estimation unit 212 estimates, based on the calculated score, which of the plurality of types of fingerprint patterns the pattern in the surface image is.

Figure 11A:
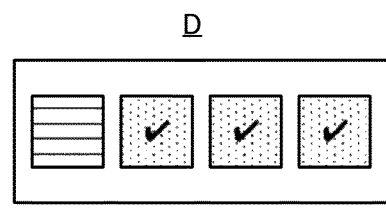
FIG. 11A is diagrams illustrating display examples of a display screen by the information processing apparatus according to the fifth example embodiment.
Figure 11B:
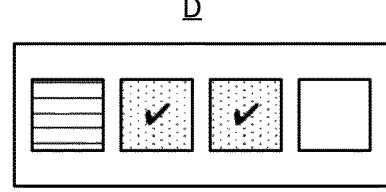
FIG. 11B is diagrams illustrating display examples of a display screen by the information processing apparatus according to the fifth example embodiment.
Figure 11C:
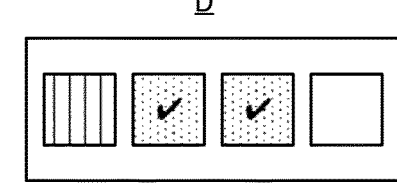
FIG. 11C is diagrams illustrating display examples of a display screen by the information processing apparatus according to the fifth example embodiment.
Figure 11D:
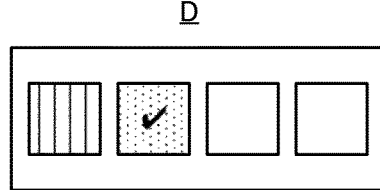
FIG. 11D is diagrams illustrating display examples of a display screen by the information processing apparatus according to the fifth example embodiment.
Figure 11E:
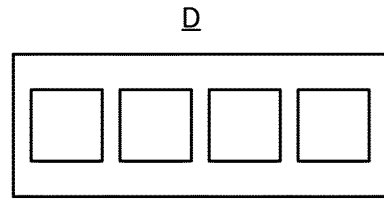
FIG. 11E is diagrams illustrating display examples of a display screen by the information processing apparatus according to the fifth example embodiment.

In the step S44 illustrated in FIG. 9, the display control unit 315 may allow the display apparatus to display the display screen D illustrated in FIG. 11A. That is, the display control unit 315 may allow the display of a horizontal line pattern indicating high reliability in a left box.

Furthermore, in the step S47 (the step S46: Yes) illustrated in FIG. 9, the display control unit 315 may allow the display apparatus to display the display screen D illustrated in FIG. 11B. That is, the display control unit 315 may allow the display of the horizontal line pattern indicating high reliability in the left box. On the other hand, in the step S48 (the step S46: No) illustrated in FIG. 9, the display control unit 315 may allow the display apparatus to display the display screen D illustrated in FIG. 11C. That is, the display control unit 315 may allow the display of a vertical line pattern indicating medium reliability in the left box. That is, the display control unit 315 allows the display apparatus to display the display screen D such that a display aspect of the display screen D when the difference is greater than or equal to the threshold between the sum of scores corresponding to the pattern with the largest sum of scores of the surface images estimated to have the same pattern and the sum of scores corresponding to the pattern with the second largest sum of scores, is different from a display aspect of the display screen D when the difference is less than the threshold.

Furthermore, in the step S50 (the step S49: Yes) illustrated in FIG. 9, the display control unit 315 may allow the display apparatus to display the display screen D illustrated in FIG. 11D. That is, the display control unit 315 may allow the display of the vertical line pattern indicating medium reliability the left box. On the other hand, in the step S51 (the step S49: No) illustrated in FIG. 9, the display control unit 315 may allow the display apparatus to display the display screen D illustrated in FIG. 11E. That is, the display control unit 315 may leave all the boxes blank and may allow the display of the display screen D that expresses that reliable surface image is not yet acquired.

5-3: Technical Effect of Information Processing Apparatus 5

The information processing apparatus 5 according to the fifth example embodiment is capable of notifying the manager of the reliability of the estimated pattern.

6: Sixth Example Embodiment

An information processing apparatus, an information processing method, and a recording medium according to a sixth example embodiment will be described. The following describes the information processing apparatus, the information processing method, and the recording medium according to the sixth example embodiment, by using an information processing apparatus 6 to which the information processing apparatus, the information processing method, and the recording medium according to the sixth example embodiment are applied.

6-1: Configuration of Information Processing Apparatus 6

Figure 12:
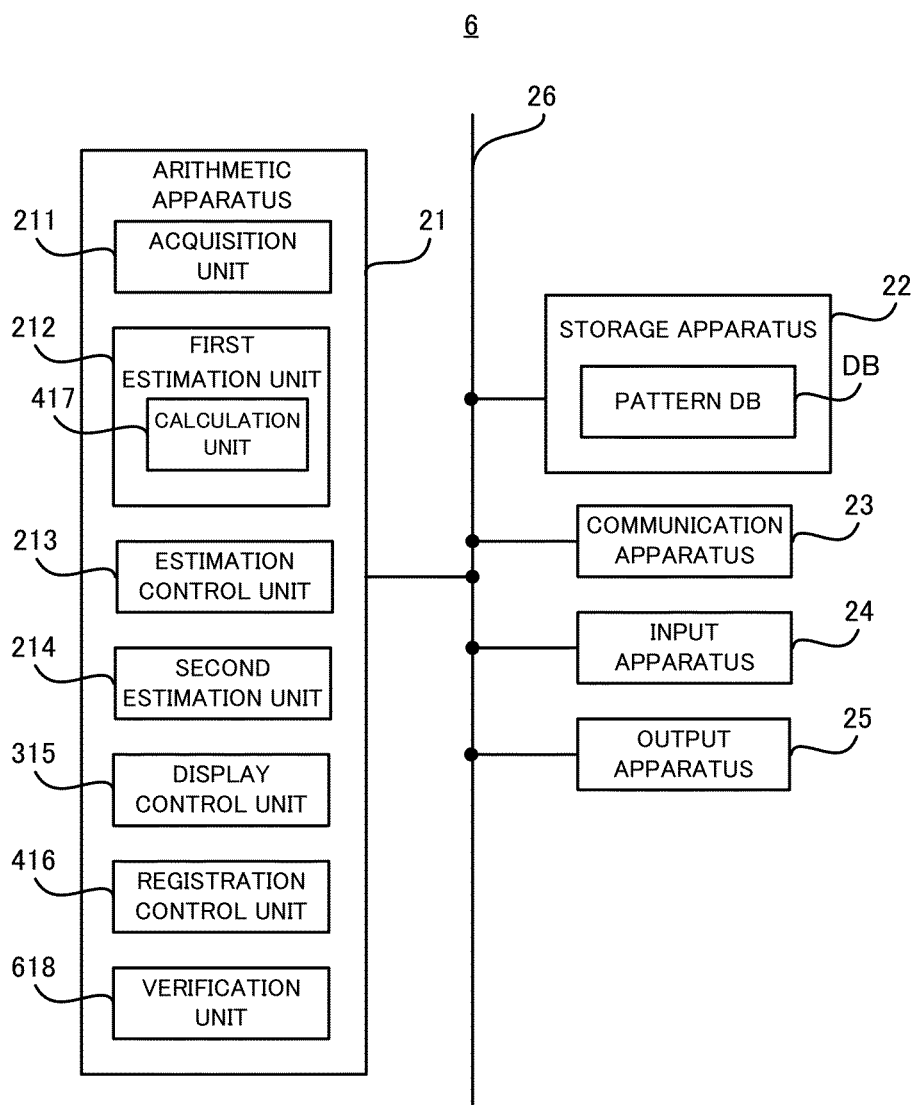
FIG. 12 is a block diagram illustrating a configuration of an information processing apparatus according to a sixth example embodiment.

With reference to FIG. 12, a configuration of the information processing apparatus 6 according to the sixth example embodiment will be described. FIG. 12 is a block diagram illustrating the configuration of the information processing apparatus 6 according to the sixth example embodiment.

As illustrated in FIG. 12, the information processing apparatus 6 according to the sixth example embodiment includes the arithmetic apparatus 21 and the storage apparatus 22, as in the information processing apparatus 2 according to the second example embodiment to the information processing apparatus 5 according to the fifth example embodiment. Furthermore, the information processing apparatus 6 may include the communication apparatus 23, the input apparatus 24, and the output apparatus 25, as in the information processing apparatus 2 according to the second example embodiment to the information processing apparatus 5 according to the fifth example embodiment. The information processing apparatus 6, however, may not include at least one of the communication apparatus 23, the input apparatus 24, and the output apparatus 25. The information processing apparatus 6 according to the sixth example embodiment is different from the information processing apparatus 2 according to the second example embodiment to the information processing apparatus 5 according to the fifth example embodiment, in that the arithmetic apparatus 21 further includes a verification unit 618. Other features of the information processing apparatus 6 may be the same as those of at least one of the information processing apparatus 2 according to the second example embodiment to the information processing apparatus according to the fifth example embodiment. For this reason, a part that is different from each of the example embodiments described above will be described in detail below, and a description of the other overlapping parts will be omitted as appropriate.

6-2: Information Processing Operation Performed by Information Processing Apparatus 6

Figure 14:
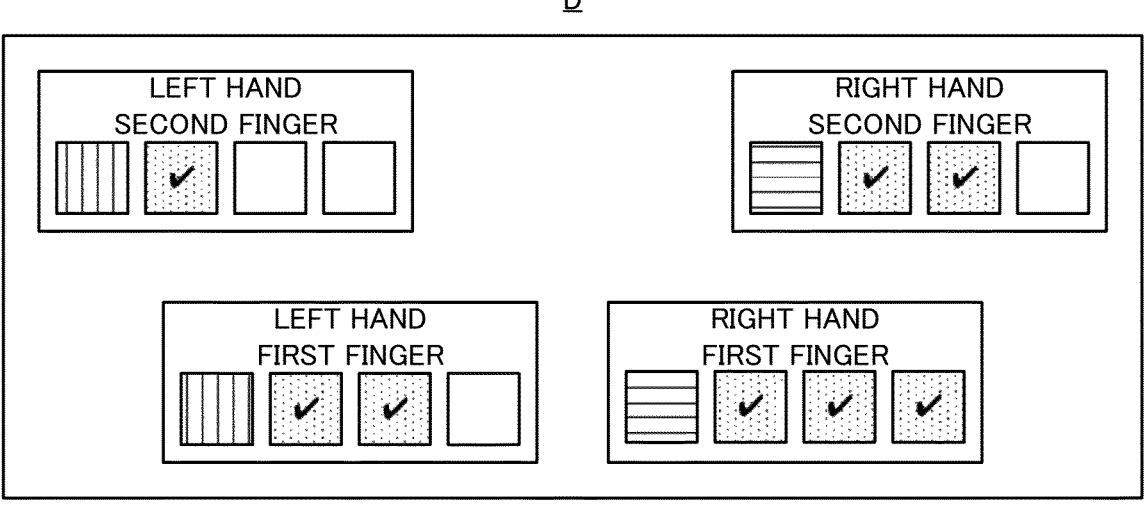
FIG. 14 is a diagram illustrating a display example of a display screen by the information processing apparatus according to the sixth example embodiment.

With reference to FIGS. 13A and 13B and FIG. 14, an information processing operation performed by the information processing apparatus 6 according to the sixth example embodiment will be described. FIG. 13A is a flowchart illustrating a flow of a pattern registration operation performed by the information processing apparatus 6 according to the sixth example embodiment, and FIG. 13B is a flowchart illustrating a flow of a verification operation performed by the information processing apparatus 6 according to the sixth example embodiment. FIG. 14 is a diagram illustrating a display example of the display screen D.

[Registration Operation]

As illustrated in FIG. 13A, the second estimation unit 214 estimates the pattern of the fingerprints of the target person (step S100). The second estimation unit 214 may estimate the pattern of the fingerprints by the same operation as that of at least one of the information processing apparatus 2 according to the second example embodiment to the information processing apparatus according to the fifth example embodiment. Information indicating an estimation result of the pattern by the second estimation unit 214 may be referred to as element information.

The second estimation unit 214 may estimate which of the above-described five types (or six types, or any type) of fingerprint patterns the fingerprint pattern of each of four fingers is, wherein the four fingers are first fingers and second fingers of both hands.

When the four fingers of the newborn are a target of the second estimation operation, the second estimation unit 214 may estimate which of the plurality of types of fingerprint patterns (e.g., the above-described five types of Whorl (W), Double Loop (D), Left Loop (L), Right Loop (R), and Arch (A)) the pattern of the fingerprints of each of the four fingers is.

The second estimation unit 214 determines whether or not all the patterns of the fingerprints that are the target of the second estimation operation are estimated (step S101). When there is a target of the second estimation operation for which the pattern of the fingerprints is not estimated (the step S101: No), the flow returns to the step S100.

FIG. 14 illustrates the display screen D during estimation of the fingerprint pattern of the fingerprints of each of the four fingers that are the first fingers and the second fingers of both hands. FIG. 14 illustrates that the estimation of the pattern is completed for the first finger of the right hand. FIG. 14 also illustrates that highly reliable estimation is performed for the second finger of the right hand, but one more sheet of surface image with the first pattern is necessary. FIG. 14 also illustrates that estimation with medium reliability is performed for the first finger of the left hand, and one more sheet of surface image with the first pattern is necessary. FIG. 14 also illustrates that estimation with medium reliability is performed for the second finger of the left hand, and two more sheets of surface images with the first pattern are necessary. That is, FIG. 14 illustrates a case where there is a target of the second estimation operation in which the estimation of the pattern of the fingerprints is not completed.

When all the patterns of the fingerprints of the target of the second estimation operation are estimated (the step S101: Yes), the registration control unit 416 generates registration pattern information in which the respective patterns of the plurality of fingers estimated by the second estimation unit 214 are combined (step S102).

The registration control unit 416 registers the registration pattern information in association with the finger information corresponding to each of the plurality of fingers (step S103). The registration control unit 416 may store the registration pattern information in which the respective patterns of the plurality of fingers estimated by the second estimation unit 214 are combined, in the pattern database DB, in association with the finger information corresponding to each of the plurality of fingers. The registration pattern information may be information indicating arrangement of the element information (hereinafter referred to as "sequence data" in some cases).

In the sixth example embodiment, the registration control unit 416 may store the registration pattern information in which respective pieces of element information corresponding to the plurality of fingers estimated by the second estimation unit 214 are combined, in the pattern database DB, in association with the finger information. For example, the registration control unit 416 may store the sequence data in which respective pieces of element information corresponding to the four fingers are combined, in the pattern database DB, in association with the finger information. When the second estimation unit 214 determines the fingerprint pattern of each of the four fingers, the sequence data may be expressed as (Left Index finger—Left Thumb—Right Thumb—Right Index finger: Whorl (W)—Whorl (W)—Whorl (W)—Whorl (W).

For example, regarding an appearance ratio of fingerprint patterns among Japanese people, the appearance ratio of Whorl (W) is said to be 50%, which is the highest. Therefore, when the fingerprint patterns of all the four fingers are Whorl (W) (Left Index finger-Left Thumb-Right Thumb-Right Index finger: W-W-W-W), the appearance ratio of this type of sequence data is 6.25% (4th power of 0.5). Furthermore, when the fingerprint patterns of all the fingers of the left and right hands (ten fingers) are s Whorl (W) (W-W-W-W-W-W-W-W-W-W), the appearance ratio of this type of sequence data is 0.097% (10th power of 0.5), and the appearance ratio is lower than that in the case of the four fingers.

When the registration pattern information is the sequence data, the information processing apparatus 6 is capable of identifying the newborn with higher accuracy. The information processing apparatus 6 is capable of accurately identifying the newborn, even when it is hard to acquire biometric information of a certain level or higher quality such as, for example premature birth.

For example, it is possible to accurately identifying the newborn, even when it is hardly possible to acquire a fingerprint image of a certain level or higher quality, which is required for fingerprint authentication for an adult.

The information processing apparatus 6 may determine the number of fingers from which the fingerprint image is acquired, according to the accuracy required for the registration pattern information and a burden to the newborn. The newborn also encounters a situation where the fingerprints of all the fingers are registered after the newborn grows, and it is thus preferable that all the fingerprints can be acquired from the newborn as well. In addition, the accuracy of individual identification may be improved by increasing the number of fingerprints (the number of fingers) correctly estimated and by complicating the combination; however, increasing the number of fingers from which the fingerprints are acquired, is a big burden to the newborn.

For example, the information processing apparatus 6 may determine the number of fingers from which the fingerprint image is acquired, to reduce the accuracy required for the registration pattern information, when there are many expected births. In this instance, the information processing apparatus 6 may perform the determination to estimate the fingerprint patterns of the four fingers. In addition, the information processing apparatus 6 may perform the determination to increase the accuracy required for the registration pattern information, when there are less expected births. In this instance, the information processing apparatus 6 may perform the determination to acquire the fingerprint images from the ten fingers.

For example, when the plurality of predetermined types of fingerprint patterns are, for example, two types of fingerprint patterns with and without a delta, the information processing apparatus 6 may estimate the patterns of the fingerprints of the ten fingers and may generate registration pattern information. The information processing apparatus 6 is capable of ensuring the identity of the target person, by increasing the number of the fingers that are the estimating target, even when there are few predetermined types, such as two types.

[Verification Operation]

The verification operation by the information processing apparatus 6 may be performed before the timing when the newborn moves from a location other than his home, such as a hospital, to his home. Before the timing to move may refer to a time of moving or before moving. The information processing operation by the information processing apparatus 6 may be performed before the timing when the newborn leaves the hospital or the like.

The information processing apparatus 6 performs the verification operation illustrated in FIG. 13B after the registration operation of registering the registration pattern information by the registration control unit 416 illustrated in FIG. 13A.

The second estimation unit 214 estimates the pattern of the fingerprints of the target person (step S200). The second estimation unit 214 determines whether or not all the patterns of the fingerprints of the target of the second estimation operation are estimated (step S201). When there is a target of the second estimation operation for which the pattern of the fingerprints is not estimated (the step S201: No), the flow returns to the step S200.

The verification unit 618 generates verification pattern information in which the respective patterns of the fingerprints of the plurality of fingers estimated by the second estimation unit 214 are combined (step S202). The step S200 may be the same operation as that in the step S100, the step S201 may be the same operation as that in the step S101, and the step S202 may be the same operation as that in the step S102.

The verification unit 618 verifies the verification pattern information with the registration pattern information (step S203). The verification pattern information may be information indicating arrangement of the element information (hereinafter referred to as "sequence data" in some cases). The verification unit 618 may verify pieces of sequence data.

6-3: Technical Effect of Information Processing
Apparatus 6

Since the information processing apparatus 6 according to the sixth example embodiment uses the information in which the respective patterns of the plurality of fingers estimated are combined, it is possible to accurately identify an individual by using the biometric information, even when an identification target person is a newborn.

7: Supplementary Notes

With respect to the example embodiment described above, the following Supplementary Notes are further disclosed.

[Supplementary Note 1]

An information processing apparatus including:

an acquisition unit that performs an acquisition operation of acquiring a surface image including fingerprints of a target person;

a first estimation unit that performs a first estimation operation of estimating a pattern of the fingerprints from the acquired surface image; and an estimation control unit that controls the acquisition unit and the first estimation unit to repeat the acquisition operation and the first estimation operation until a predetermined number of surface images estimated by the first estimation unit to have a first pattern are acquired.

[Supplementary Note 2]

The information processing apparatus according to Supplementary Note 1, further including a second estimation unit that performs a second estimation operation of estimating that the first pattern is a pattern of the fingerprints of the target person, when the predetermined number of surface images estimated by the first estimation unit to have the first pattern are acquired.

[Supplementary Note 3]

The information processing apparatus according to Supplementary Note 2, further including a registration control unit that registers finger information in which information indicating the first pattern is associated with the predetermined number of surface images estimated to have the first pattern.

[Supplementary Note 4]

The information processing apparatus according to Supplementary Note 3, wherein the registration control unit deletes a surface image other than the predetermined number of surface images estimated to have the first pattern, among a plurality of surfaces image acquired by the acquisition unit until the predetermined number of surfaces images estimated by the first estimation unit to have the first pattern are acquired.

[Supplementary Note 5]

The information processing apparatus according to Supplementary Note 2, wherein the first estimation unit calculates a score indicating a possibility that the pattern in the surface image is each of a plurality of predetermined types of patterns, and estimates, based on the calculated score, which of the plurality of types of patterns the pattern in the surface image is, and in a case where a number of surface images corresponding to a pattern with a largest sum of the scores of the surface images estimated to have a same pattern is less than or equal to the predetermined number, and in a case where a difference is greater than or equal to a threshold between a sum of the scores corresponding to the pattern with the largest sum of the scores and a sum of the scores corresponding to a pattern with a second largest sum of the scores, the second estimated unit estimates reliability of the pattern with the largest sum of the scores to be higher than that in a case where the difference is less than the threshold.

[Supplementary Note 6]

The information processing apparatus according to Supplementary Note 1, further including a display control unit that allows a display apparatus to display a display screen including information about a control operation of the estimation control unit.

[Supplementary Note 7]

The information processing apparatus according to Supplementary Note 6, wherein the information includes information about a number of surface images estimated to have a same pattern.

[Supplementary Note 8]

The information processing apparatus according to Supplementary Note 6, wherein the first estimation unit calculates a score indicating a possibility that the pattern in the surface image is each of a plurality of predetermined types of patterns, and estimates, based on the calculated score, which of the plurality of types of patterns the pattern in the surface image is, and the display control unit allows the display apparatus to display the display screen such that a display aspect of the display screen in a case where a difference is greater than or equal to a threshold between a sum of the scores corresponding to a pattern with a largest sum of the scores of the surface images estimated to have a same pattern and a sum of the scores corresponding to a pattern with a second largest sum of the scores, is different from a display aspect of the display screen in a case where the difference is less than the threshold.

[Supplementary Note 9]

The information processing apparatus according to Supplementary Note 3, wherein the second estimation unit estimates respective patterns of fingerprints of a plurality of fingers of the target person, and the registration control unit registers registration pattern information in which the respective patterns of the plurality of fingers estimated by the second estimation unit are combined, in association with the finger information corresponding to each of the plurality of fingers.

[Supplementary Note 10]

An information processing method including:

performing an acquisition operation of acquiring a surface image including fingerprints of a target person;

performing a first estimation operation of estimating a pattern of the fingerprints from the acquired surface image; and performing control to repeat the acquisition operation and the first estimation operation until a predetermined number of surface images estimated by the first estimation operation to have a first pattern are acquired.

[Supplementary Note 11]

A recording medium on which a computer program that allows a computer to execute an information processing method is recorded, the information processing method including:

performing an acquisition operation of acquiring a surface image including fingerprints of a target person;

performing a first estimation operation of estimating a pattern of the fingerprints from the acquired surface image; and performing control to repeat the acquisition operation and the first estimation operation until a predetermined number of surface images estimated by the first estimation operation to have a first pattern are acquired.

[Supplementary Note 12]

The information processing apparatus according to Supplementary Note 8, further including a verification unit that verifies verification pattern information in which the respective patterns of fingerprints of the plurality of fingers estimated by the second estimation unit, with the registration pattern information, after the registration pattern information is registered by the registration control unit.

[Supplementary Note 13]

An information processing apparatus including:

an acquisition unit that performs an acquisition operation of acquiring a surface image including fingerprints of a target person;

a calculation unit that performs a calculation operation of calculating probability that a pattern of the fingerprints from the acquired surface image is at least any one of a plurality of predetermined types of patterns; and an estimation control unit that controls the acquisition unit and the calculation unit to repeat the acquisition operation and the calculation operation until the probability satisfies a condition for determining the pattern of the fingerprints of the target person.

[Supplementary Note 14]

An image capturing apparatus that is configured to:

perform alternate repetition of first processing of capturing a surface image including fingerprints of a target person and second processing of estimating a pattern of the fingerprints from the captured surface image; and end the repetition in a case where a predetermined number of surface images estimated to include a first pattern out of a plurality of estimated patterns are captured.

[Supplementary Note 15]

An image capturing apparatus that is configured to: capture a surface image of a finger of a target person; and repeat estimation processing of estimating a pattern of fingerprints from the captured surface image until a number of surface images estimated to have a first pattern out of estimated patterns reaches a predetermined number.

[Supplementary Note 16]

An image capturing apparatus that is configured to: capture a surface image of a finger of a target person; calculate probability that a pattern of fingerprints from the captured surface image is at least any one of a plurality of types of patterns; and repeat determination processing of determining whether the probability satisfies a condition for determining fingerprints while the condition is not satisfied.

At least a part of the constituent components of each of the example embodiments described above can be combined with at least another part of the constituent components of each of the example embodiments described above, as appropriate. A part of the constituent components of each of the example embodiments described above may not be used.

This disclosure is not limited to the examples described above. This disclosure is allowed to be changed, if desired, without departing from the essence or spirit of this disclosure which can be read from the claims and the entire identification. An information processing apparatus, an information processing method, and a recording medium with such changes are also intended to be within the technical scope of this disclosure. Furthermore, to the extent permitted by law, all publications and papers described herein are hereby incorporated by reference.

To the extent permitted by law, this application claims the benefit of priority based on Japanese application No. 2022-128256, filed Aug. 10, 2022, the entire disclosure of which is hereby incorporated by reference.

DESCRIPTION OF REFERENCE CODES

1, 2, 3, 4, 5, 6 Information processing apparatus
11, 211 Acquisition unit
12, 212 First estimation unit
13, 213 Estimation control unit
214 Second estimation unit
315 Display control unit
416 Registration control unit
417 Calculation unit
618 Verification unit
DB pattern database
D Display screen

The invention claimed is:

1. An information processing apparatus comprising:
at least one memory that is configured to store instructions; and
at least one processor that is configured to execute the instructions to:
perform an acquisition operation of acquiring a surface image including fingerprints of a target person;
perform a first estimation operation of estimating a pattern of the fingerprints from the acquired surface image;
perform control to repeat the acquisition operation and the first estimation operation until a predetermined number of surface images estimated by the first estimation operation to have a first pattern are acquired;
perform a second estimation operation of estimating that the first pattern is a pattern of the fingerprints of the target person, when the predetermined number of surface images estimated by the first estimation operation to have the first pattern are acquired;
register finger information in which information indicating the first pattern is associated with the predetermined number of surface images estimated to have the first pattern; and
delete a surface image other than the predetermined number of surface images estimated to have the first pattern, among a plurality of surface images acquired by the acquisition operation until the predetermined number of surface images estimated by the first estimation operation to have the first pattern are acquired.

2. The information processing apparatus according to claim 1, wherein the at least one processor is configured to execute the instructions to:
calculate a score indicating a possibility that the pattern in the surface image is each of a plurality of predetermined types of patterns, and estimate, based on the calculated score, which of the plurality of types of patterns the pattern in the surface image is; and
in a case where a number of surface images corresponding to a pattern with a largest sum of the scores of the surface images estimated to have a same pattern is less than or equal to the predetermined number, and in a case where a difference is greater than or equal to a threshold between a sum of the scores corresponding to the pattern with the largest sum of the scores and a sum of the scores corresponding to a pattern with a second largest sum of the scores, estimate reliability of the pattern with the largest sum of the scores to be higher than that in a case where the difference is less than the threshold.

3. An information processing apparatus comprising:

at least one memory that is configured to store instructions; and at least one processor that is configured to execute the instructions to:

perform an acquisition operation of acquiring a surface image including fingerprints of a target person;

perform a first estimation operation of estimating a pattern of the fingerprints from the acquired surface image;

perform control to repeat the acquisition operation and the first estimation operation until a predetermined number of surface images estimated by the first estimation operation to have a first pattern are acquired; and perform a second estimation operation of estimating that the first pattern is a pattern of the fingerprints of the target person, when the predetermined number of surface images estimated by the first estimation operation to have the first pattern are acquired calculate a score indicating a possibility that the pattern in the surface image is each of a plurality of predetermined types of patterns, and estimate, based on the calculated score, which of the plurality of types of patterns the pattern in the surface image is; and in a case where a number of surface images corresponding to a pattern with a largest sum of the scores of the surface images estimated to have a same pattern is less than or equal to the predetermined number, and in a case where a difference is greater than or equal to a threshold between a sum of the scores corresponding to the pattern with the largest sum of the scores and a sum of the scores corresponding to a pattern with a second largest sum of the scores, estimate reliability of the pattern with the largest sum of the scores to be higher than that in a case where the difference is less than the threshold.

4. The information processing apparatus according to claim 3, wherein the at least one processor is configured to execute the instructions to register finger information in which information indicating the first pattern is associated with the predetermined number of surface images estimated to have the first pattern.

5. The information processing apparatus according to claim 4, wherein the at least one processor is configured to execute the instructions to delete a surface image other than the predetermined number of surface images estimated to have the first pattern, among a plurality of surface images acquired by the acquisition operation until the predetermined number of surface images estimated by the first estimation operation to have the first pattern are acquired.

* * * * *